United States Patent
Wilkerson

(10) Patent No.: US 10,703,037 B2
(45) Date of Patent: Jul. 7, 2020

(54) INJECTION STRETCH BLOW MOLDING METHOD AND APPARATUS FOR PRODUCING INTERNALLY THREADED CONTAINERS

(71) Applicant: R&D Tool & Engineering Co., Lees Summit, MO (US)

(72) Inventor: Michael J. Wilkerson, Kansas City, MO (US)

(73) Assignee: R & D Tool & Engineering Co., Lee's Summit, MO (US)

( * ) Notice: Subject to any disclaimer, the term of this patent is extended or adjusted under 35 U.S.C. 154(b) by 257 days.

(21) Appl. No.: 15/905,474

(22) Filed: Feb. 26, 2018

(65) Prior Publication Data

US 2018/0178435 A1    Jun. 28, 2018

Related U.S. Application Data

(63) Continuation-in-part of application No. 14/788,105, filed on Jun. 30, 2015, now Pat. No. 9,902,103.
(Continued)

(51) Int. Cl.
| | |
|---|---|
| *B29C 49/06* | (2006.01) |
| *B29C 45/44* | (2006.01) |
| *B29C 45/40* | (2006.01) |
| *B65D 1/02* | (2006.01) |
| B29L 31/00 | (2006.01) |
| B29C 49/70 | (2006.01) |

(Continued)

(52) U.S. Cl.
CPC ........ *B29C 49/061* (2013.01); *B29C 45/4005* (2013.01); *B29C 45/44* (2013.01); *B65D 1/0207* (2013.01); *B65D 1/0246* (2013.01); B29C 2045/4042 (2013.01); B29C 2049/701 (2013.01); B29K 2067/003 (2013.01); B29K 2105/258 (2013.01); B29L 2031/7158 (2013.01)

(58) Field of Classification Search
CPC ........ B29C 45/4005; B29C 2045/4042; B29C 45/44; B29C 2049/701; B29C 49/061; B29C 49/063
See application file for complete search history.

(56) References Cited

U.S. PATENT DOCUMENTS

| | | | |
|---|---|---|---|
| 3,203,077 A * | 8/1965 | Zimmerle | ............ H02K 15/024 |
| | | | 29/598 |
| 4,929,410 A | 5/1990 | Meyer et al. | |

(Continued)

*Primary Examiner* — Robert B Davis
(74) *Attorney, Agent, or Firm* — Hovey Williams LLP

(57) ABSTRACT

A carrier assembly for injection molding a parison with internal threads. The carrier assembly may be used with an injection stretch blow molding machine that includes a core rod. The carrier assembly comprises a carrier insert surrounding a portion of the core rod. The carrier insert includes a thread-forming portion presenting an interior radial surface and an exterior radial surface. The interior radial surface is configured to be positioned adjacent to the core rod, and the exterior radial surface includes a threaded protrusion configured to extend away from the core rod. The carrier assembly also includes a pinion insert surrounding at least a portion of the threaded protrusion of the thread-forming portion of the carrier insert. The pinion insert is spaced apart from the thread-forming portion of the carrier insert so as to present a thread-forming cavity between the pinion insert and the carrier insert.

19 Claims, 26 Drawing Sheets

Related U.S. Application Data

(60) Provisional application No. 62/019,468, filed on Jul. 1, 2014.

(51) Int. Cl.
*B29K 67/00* (2006.01)
*B29K 105/00* (2006.01)

(56) References Cited

U.S. PATENT DOCUMENTS

| | | |
|---|---|---|
| 4,941,815 A | 7/1990 | Julian |
| 4,989,757 A | 2/1991 | Krall |
| 5,067,891 A | 11/1991 | Julian |
| 5,114,659 A | 5/1992 | Krall |
| 5,518,679 A | 5/1996 | Junk |
| 5,798,074 A * | 8/1998 | McCready ............ B29C 45/262 264/318 |
| 6,068,811 A | 5/2000 | Koda |
| 7,980,403 B2 | 7/2011 | Martinez |
| 2005/0139569 A1 | 6/2005 | Larsen et al. |
| 2006/0172027 A1* | 8/2006 | Hansen ................ B29C 49/56 425/150 |

* cited by examiner

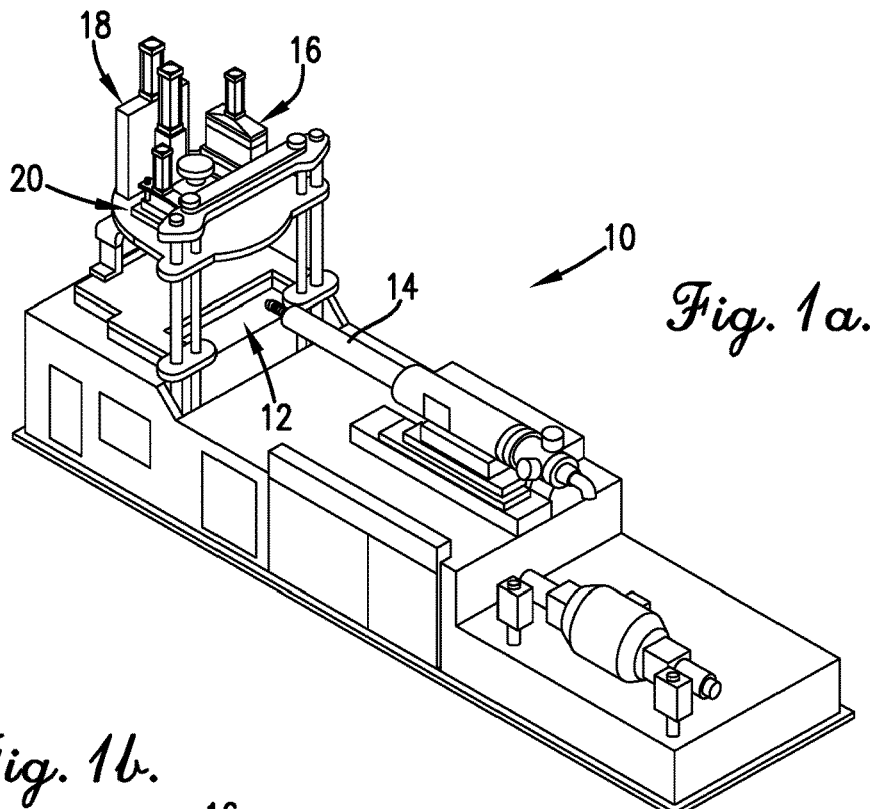
Fig. 1a.
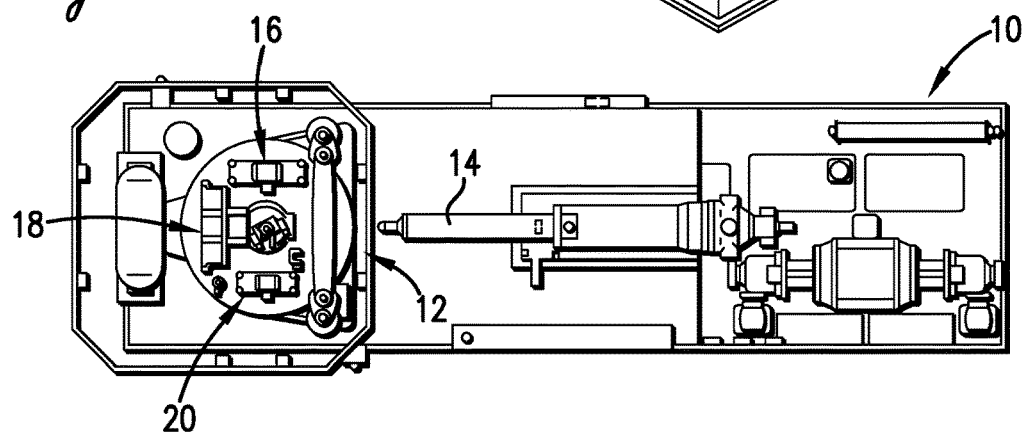
Fig. 1b.
Fig. 1c.

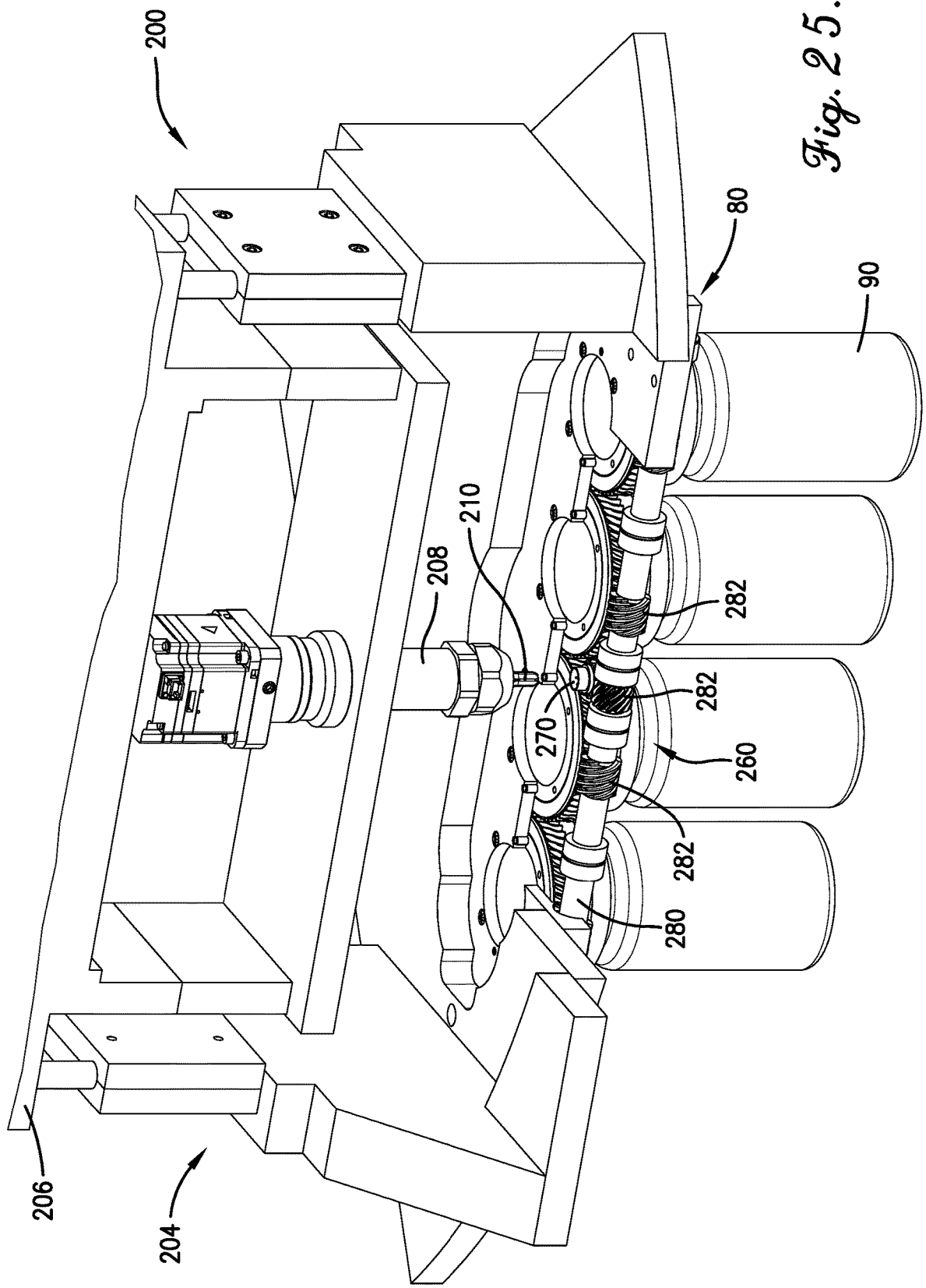

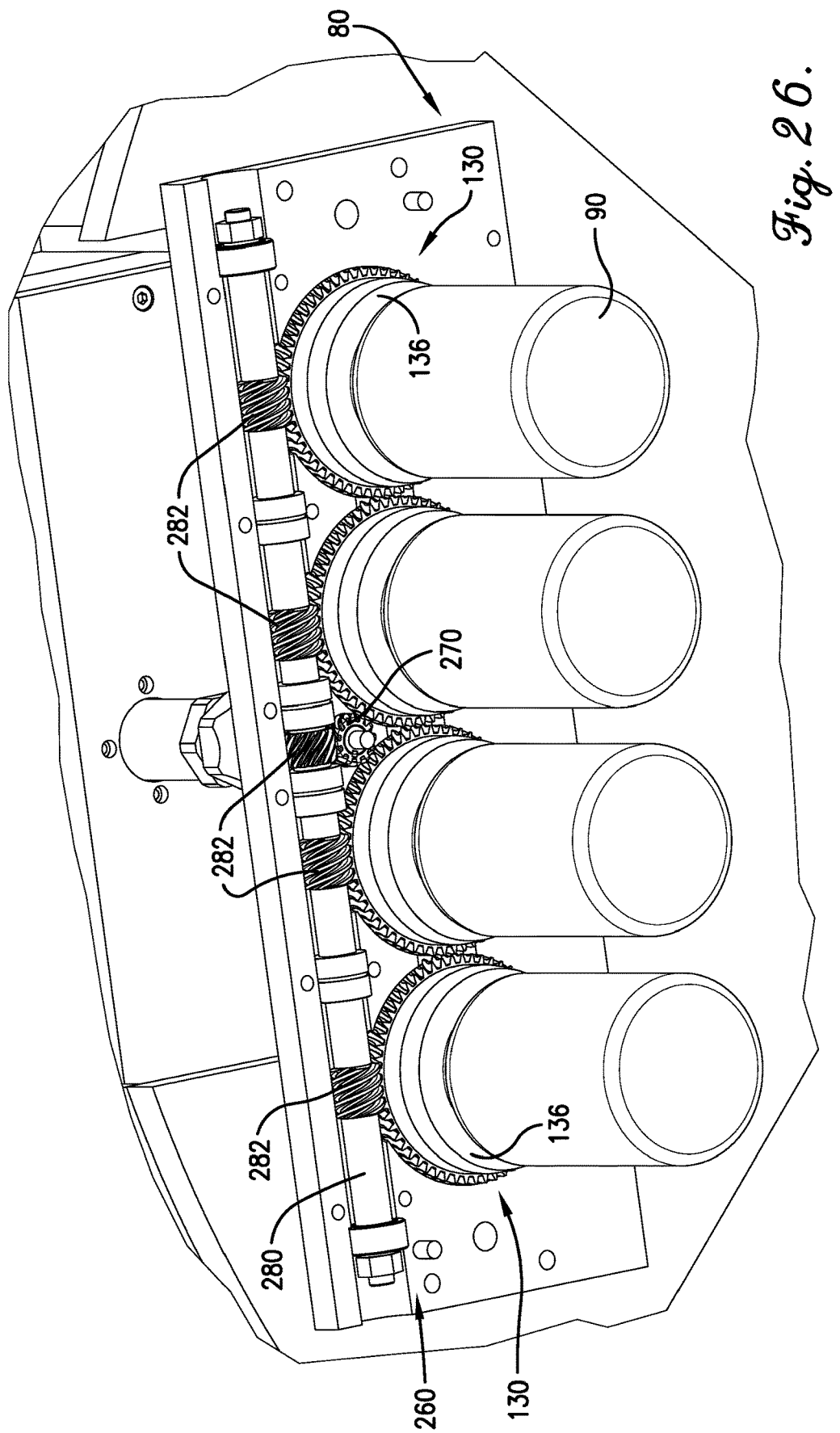

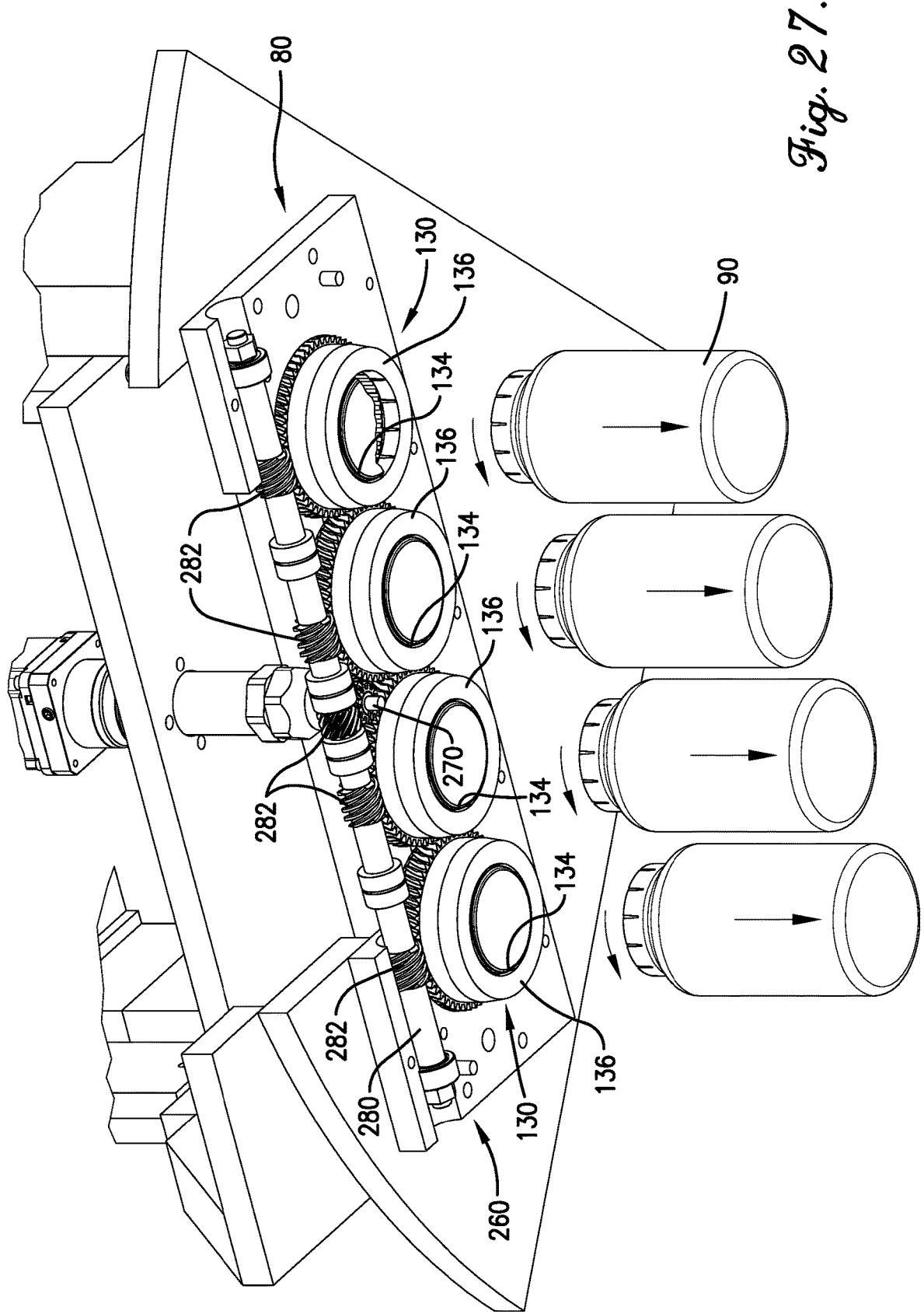

INJECTION STRETCH BLOW MOLDING METHOD AND APPARATUS FOR PRODUCING INTERNALLY THREADED CONTAINERS

RELATED APPLICATION

This U.S. patent application is a continuation-in-part application of, and claims priority benefit to, co-pending U.S. patent application Ser. No. 14/788,105, filed on Jun. 30, 2015, and entitled "INJECTION STRETCH BLOW MOLDING METHOD AND APPARATUS FOR PRODUCING INTERNALLY THREADED CONTAINERS," which claims priority to U.S. Provisional Patent Application Ser. No. 62/019,468, filed on Jul. 1, 2014, and entitled "ISBM METHOD AND APPARATUS FOR PRODUCING INTERNALLY THREADED CONTAINERS." The entirety both above-identified prior-filed patent applications are incorporated herein by reference.

BACKGROUND OF THE INVENTION

1. Field of the Invention

Embodiments of the present invention relate to an injection stretch blow molding method and apparatus for producing internally threaded containers.

2. Description of the Related Art

Injection stretch blow molding (ISBM) is a technique used for creating various containers such as plastic bottles. The ISBM process is performed with an ISBM machine that first injection molds a resin into a plurality of parisons of desired shapes, conditions the parisons in preparation for stretch blow molding, stretch blow molds the parisons into the final molded articles, and then ejects the molded articles from the ISBM machine. ISBM machines generally include two types, 3-stage or 4-stage. The 4-stage ISBM machines may broadly comprise an injection station for injection molding the resin into the parisons, a conditioning station for processing the parisons (e.g., applying heat and/or cooling to the parisons), a stretch blow station for stretch blow molding the parisons into the final molded articles, an ejection station for ejecting the molded articles from the ISBM machine, and a rotation plate for transferring the parisons and the molded articles between the stations of the ISBM machine. The 3-stage ISBM machine differs from the 4-stage machine in that the 3-stage machine will not include a conditioning station.

Typically, the molded articles formed by the ISBM machine are containers. Such containers are often manufactured in the form of plastic bottles, with such bottles having a main body and a neck extending up from the main body. The necks will include threaded exterior surfaces for securing lids or caps to the containers. The lids or caps serve to seal the containers and their contents. In certain instances, it would be preferable to manufacture containers that include necks with threaded interior surfaces, such that lids or caps could be secured to the container via the threaded interior surfaces. Such internally threaded containers may be beneficial because they can create better seals and/or can minimize or alleviate leakages. Additionally, containers with internal threads may provide for smooth outer surfaces, which can be more aesthetically pleasing.

Thus, it would be desirable to have an ISBM machine and method for producing molded articles (e.g., containers) with internal threads, such that the molded articles can be sealed via the internal threads.

SUMMARY

Embodiments of the present invention include a carrier assembly for injection molding a parison with internal threads. The carrier assembly may be used with an injection stretch blow molding machine that includes a core rod. The carrier assembly comprises a carrier insert surrounding a portion of the core rod. The carrier insert includes a thread-forming portion presenting an interior radial surface and an exterior radial surface. The interior radial surface is configured to be positioned adjacent to the core rod, and the exterior radial surface includes a threaded protrusion configured to extend away from the core rod. The carrier assembly also includes a pinion insert surrounding at least a portion of the threaded protrusion of the thread-forming portion of the carrier insert. The pinion insert is spaced apart from the thread-forming portion of the carrier insert so as to present a thread-forming cavity between the pinion insert and the carrier insert.

Embodiments of the present invention additionally include ejection station tooling for an injection stretch blow molding machine. The ejection station tooling is configured for ejecting an internally-threaded molded article from a carrier assembly. The ejection station tooling comprises a base and an actuation assembly associated with the base. The actuation assembly includes a plate configured to actuate in a first dimension and a bar configured to actuate in a second dimension in response to the actuation of the plate. The ejection station tooling is operable to remove the molded article from the carrier assembly by causing the molded article to rotate with respect to a portion of the carrier assembly.

Embodiments of the present invention further include a method of making an internally-threaded stretch blow molded article. The method includes the initial step of injection molding a resin to form at least one parison at an injection station. During the injection step, the parison is formed by injecting the resin into a thread-forming cavity defined by a carrier assembly. The carrier assembly comprises a carrier insert including a thread-forming portion presenting an exterior radial surface having a threaded protrusion. The carrier assembly further comprises a pinion insert surrounding at least a portion of the threaded protrusion of the thread-forming portion of the carrier insert, with the pinion insert being spaced apart from the thread-forming portion so as to present the thread-forming cavity. An additional step includes transferring the parison, via the carrier assembly, to a stretch blow station. An additional step includes stretch blow molding the parison into a molded article at the stretch blow station. An additional step includes transferring the molded article, via the carrier assembly, to an ejection station. An additional step includes ejecting the parison from the carrier assembly at the ejection station. During the ejecting step, the ejection station causes a rotation of the molded article with respect to at least a portion of the carrier assembly, such that the molded article is removed from the carrier assembly.

Embodiments of the present invention yet further include a stretch blow molded article comprising an article body stretch blown from a parison, and an article neck extending from the article body and presenting an opening for fluidly coupling an exterior of the molded article to an interior of the article body. The article neck includes an interior radial surface an exterior radial surface, and the interior radial surface includes threads formed thereon.

Embodiments of the present invention further include ejection station tooling for an injection stretch blow molding machine. The ejection station tooling comprises a carrier plate and a plurality of carrier assemblies secured to the carrier plate, with each of the carrier assemblies being configured to carry an internally-threaded molded article. The ejection station tooling additionally comprises an actuation assembly configured to remove each of the molded articles from its respective carrier assembly by causing the molded article to rotate with respect to a portion of its carrier assembly Embodiments of the present invention further include ejection station tooling for an injection stretch blow molding machine. The ejection station tooling comprises a carrier plate, and a plurality of carrier assemblies secured to the carrier plate, with each of the carrier assemblies being configured to carry an internally-threaded molded article. The ejection station tooling additionally comprises a rotation assembly integrated with the carrier plate. The rotation assembly is configured to remove each of the molded articles from its respective carrier assembly by causing the molded article to rotate with respect to a portion of its carrier assembly.

Embodiments of the present invention further include a method of ejecting an internally-threaded molded article from an injection stretch blow molding machine. The internally-threaded molded article is secured in place by a carrier assembly. The method comprises the step of shifting a drive mechanism into engagement with a rotation assembly. An additional step includes causing one or more components of said rotation assembly to rotate. A further step includes imparting rotation from the rotation assembly to a first portion of the carrier assembly. During the imparting step, the molded article is disengaged from the carrier assembly by causing the molded article to rotate with respect to a second portion of the carrier assembly.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 1a is a perspective view of an injection stretch blow molding machine;

FIG. 1b is a top plan view of the machine from FIG. 1a;

FIG. 1c is a side elevational view of the machine from FIGS. 1a and 1b;

FIG. 25 is a front perspective view of ejection station tooling according to yet another embodiment of the present invention, with a bottom portion of the tooling cut away to illustrate a rotation assembly in the form of a worm gear for removing internally-threaded molded articles from carrier assemblies;

Figure 2:
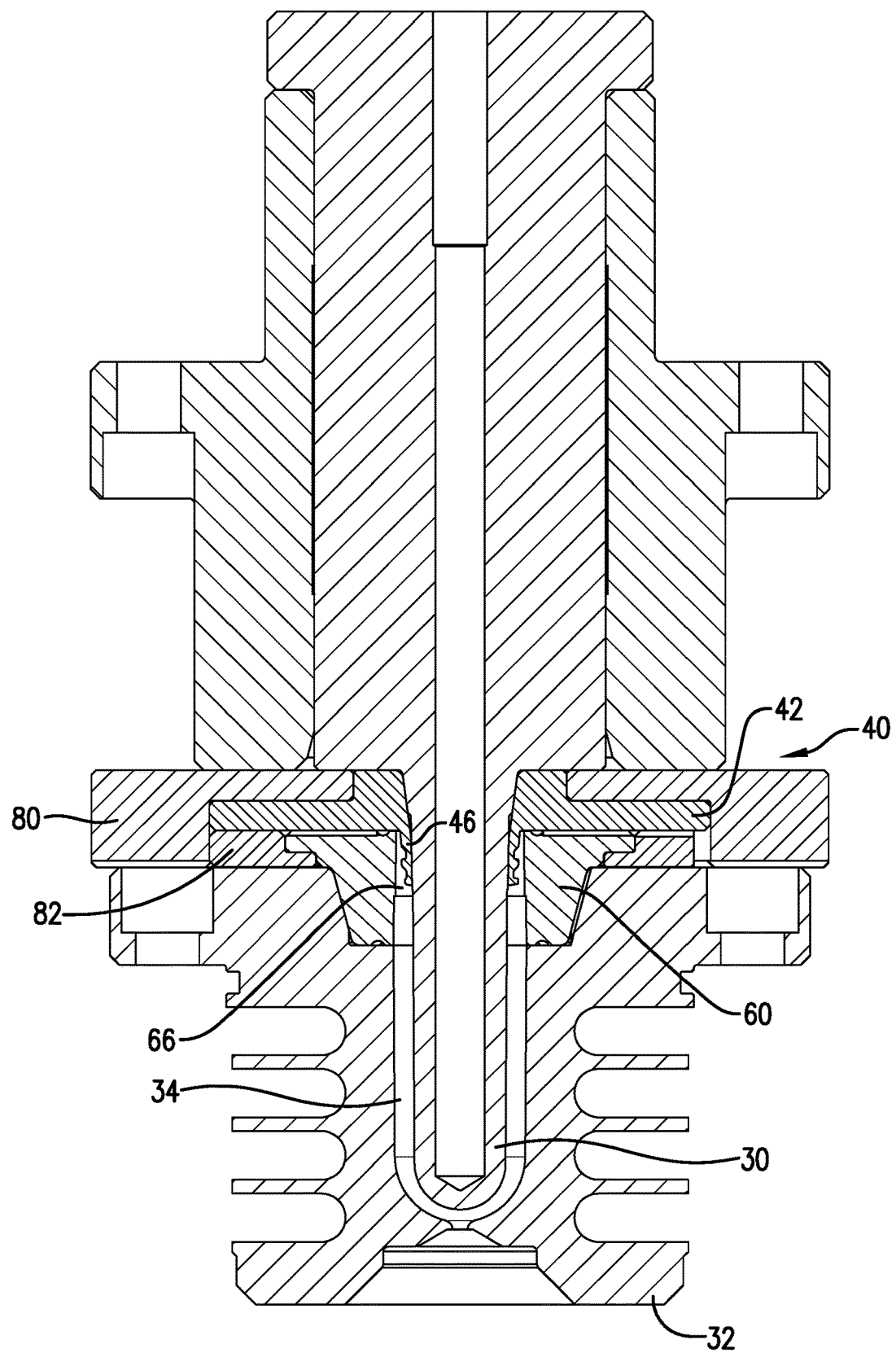
FIG. 2 is a cross-section of a carrier assembly and a core rod associated with an injection mold.

FIG. 26 is a bottom perspective view of the ejection station tooling from FIG. 25, with a bottom portion of a carrier plate cut away to illustrate the rotation assembly in more detail; and FIG. 27 is another bottom perspective view of the ejection station tooling from FIGS. 25 and 26, illustrating the rotation assembly being used to remove the internally-threaded molded articles from their carrier assemblies.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Embodiments of the present invention are configured for use with an ISBM machine, such as ISBM machine 10 illustrated in FIGS. 1a-1c. The ISBM machine 10 broadly comprises an injection station 12 associated with an injection nozzle 14, a conditioning station 16, stretch blow station 18, and an ejection station 20. In addition, the ISBM machine 10 may include a rotation plate (not shown) configured to carry a row of thread splits or the like (not shown in FIGS. 1a-1c) for transferring the parisons and/or the molded articles between the stations of the ISBM machine 10. As such, the ISBM machine 10 is operable to inject resin into molds to form a plurality of parisons, and then to stretch blow mold the parisons into a plurality of molded articles.

In more detail, the ISBM processes performed with the ISBM machine 10 may include the initial step of injecting a thermoplastic resin (e.g., Polyethylene terephthalate (PET)) within molds at the injection station 12 via the nozzle 14 to form one or more parisons. The ISBM process may then include the next step of actuating the rotation plate to transfer the resulting parisons from the injection station 12 to the conditioning station 16 such that the parisons can undergo heat treatment or other conditioning processes. As previously described, some ISBM machines may not include a conditioning station 16, such that the parisons are transferred directly from the injection station 12 to the stretch blow station 18. Regardless, the rotation plate next transfers the parisons to the stretch blow station 18 to stretch blow the parisons into molded articles. Next, the molded articles may be transferred via the rotation plate to the ejection station 20, where the molded articles are ejected from the ISBM machine 10. The injection stretch blow molding process described above may be performed repetitively by the ISBM machine 10. For example, the method steps described herein may be repeated at least 100, 1,000, or 10,000 consecutive times.

Beneficially, embodiments of the present invention provide for the ISBM machine 10 to create parisons with internal threads. Specifically, as will be described in more detail below, the internal threads may be formed on neck portions of the parisons. Furthermore, once the parisons are stretch blown, the resulting molded articles will correspondingly include internal threads on neck portions of the molded articles. As such, the internal threads formed on the neck portions of the parisons and/or the molded articles can function as closure components, such that lids or caps can be secured to the parisons and/or molded articles via the internal threads.

Figure 3:
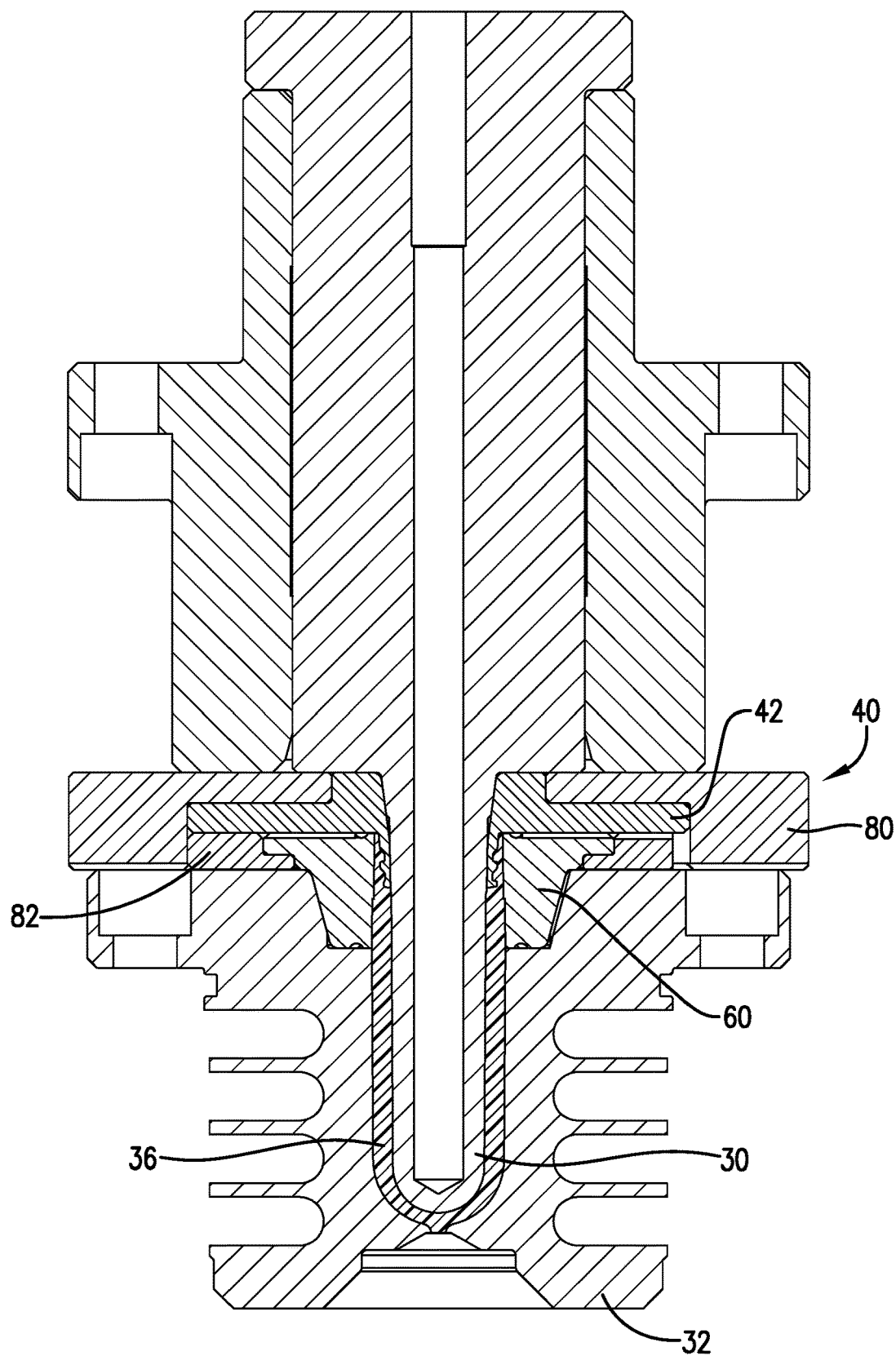
FIG. 3 is a cross-section of the carrier assembly, the core rod, and the injection mold from FIG. 2, with resin having been injected into the mold to form a parison.

In more detail, the ISBM machine 10 may, at the injection station 12, be configured to inject molten resin (e.g., PET) into a plurality mold cavities formed within a mold to create the parisons. In some embodiments, each of the molds that include a mold cavity may comprise a pair of individual mold halves that are configured to split or separate between a closed position and an open position. In the closed position, the mold halves cooperate to define the mold cavity. To facilitate the creation of the parison, and with reference to FIG. 2, an individual core rod 30 may inserted within an individual mold cavity of a mold 32 (e.g., between the mold halves, of which only a single mold half is shown in FIG. 2), such that the core rod 30 and the mold 32 cooperatively define a parison-forming cavity 34. As apparent from FIG. 2, the parison-forming cavity 34 may be defined as the sub-space or void within the mold cavity that extends between the core rod 30 and the interior surface of the mold 32. As illustrated in FIG. 3, molten resin can be injected within the parison-forming cavity 34 so as to form a shape corresponding to the mold 32 and the core rod 30. Once the resin sufficiently cools, it will harden to form a parison 36 with the shape corresponding to the mold 32 and the core rod 30.

To facilitate the production of a parison 36 formed within internal threads, embodiments of the present invention provide for the core rod 30 to be associated with a carrier assembly 40, as shown in FIGS. 2-6, that facilitates the production of such internal threads. Furthermore, in addition to facilitating the manufacture of an internally threaded parison, as described in more detail below, the carrier assembly 40 may be operable to secure the parison 36 for transport, via the rotation plate, between each stations of the ISBM machine 10. As such, the carrier assembly 40 may replace thread splits used with standard ISBM machines.

In more detail, and remaining with FIGS. 2-6, the carrier assembly 40 may comprise a carrier insert 42 configured to surround a portion of the core rod 30. The carrier insert may generally have an annular shape including an inner diameter and an outer diameter. As perhaps best shown in FIGS. 4 and 6, the carrier insert 42 may include a main section 44 formed as an annular plate or a ring. The carrier insert may additionally comprise thread-forming portion 46 that extends down from the main section 44. The thread-forming portion 46 may be formed with an interior radial surface and an exterior radial surface. As shown in FIGS. 2-3, when the carrier assembly 40 is associated with the core rod 30, the interior radial surface of the carrier insert 42 is positioned adjacent to and/or in contact with the core rod 30. Contrastingly, the exterior radial surface extends away from the core rod 30 and comprises, as will be discussed in more detail below, a threaded protrusion 48 that protrudes from the exterior radial surface.

Figure 4:
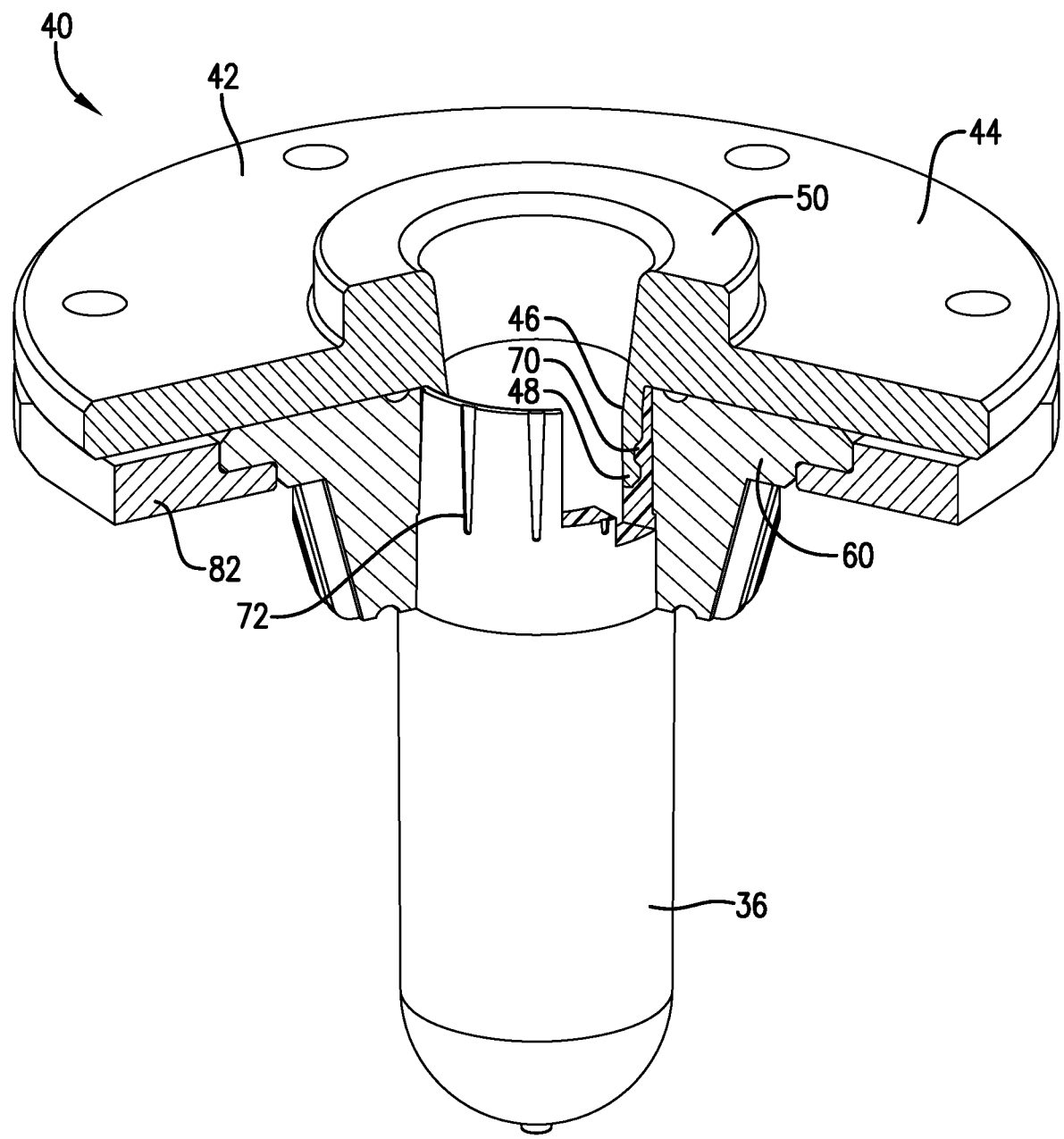
FIG. 4 is a partial perspective view of the carrier assembly and parison from FIG. 3, with a portion of the carrier assembly and the parison cut away.
Figure 5:
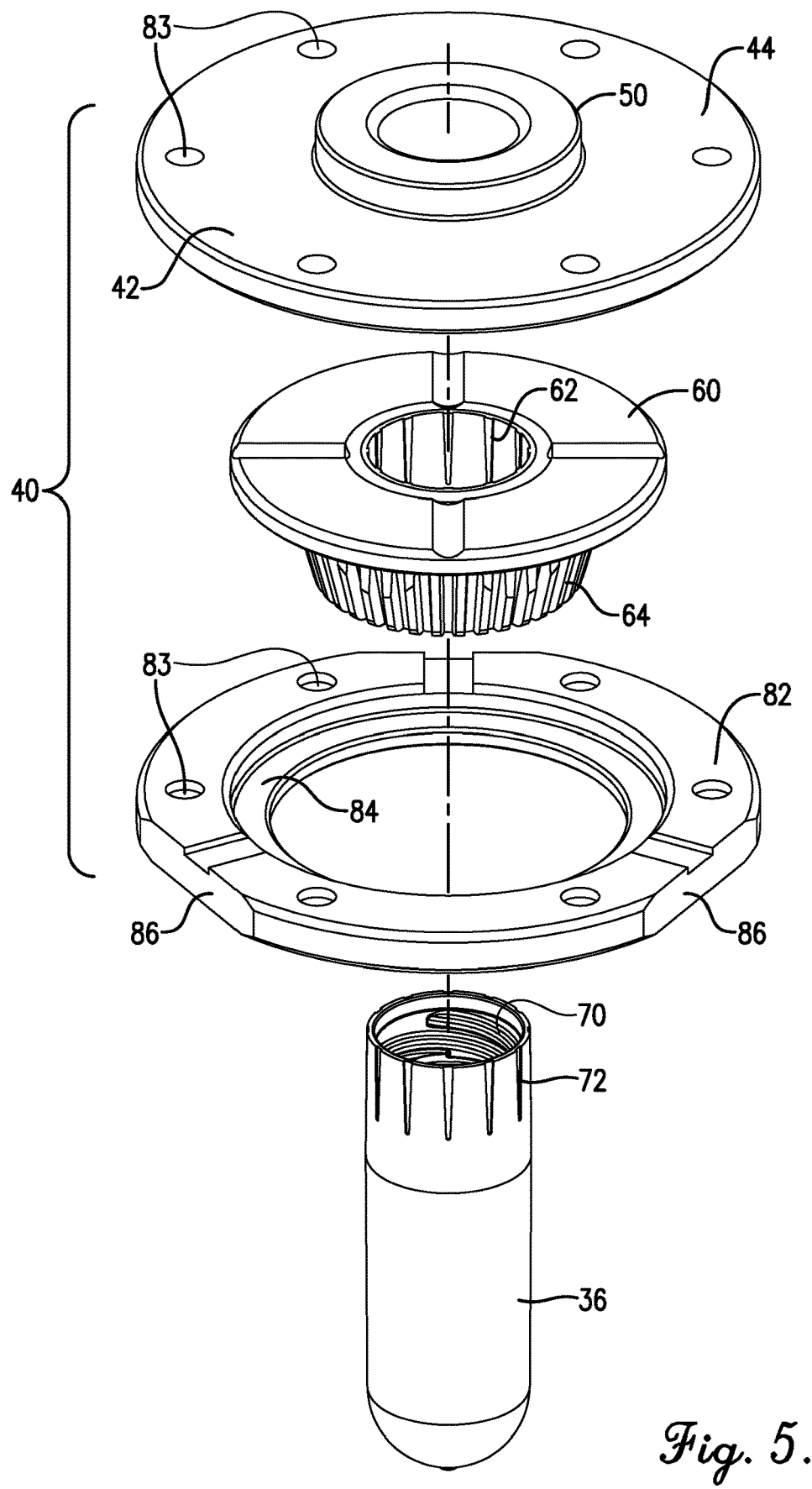
FIG. 5 is a top exploded view of the carrier assembly and parison from FIG. 4.

In some embodiments, as perhaps best shown in FIGS. 4-5, the carrier insert 42 may include an annular protrusion 50 extending up from the main section 44. Although the outer diameter of the carrier insert 42 may be discontinuous between each of the sections (e.g., between the main section 44, the thread-forming portion 46, and the annular protrusion 50), the inner diameter of the carrier insert 42 may be consistent or may vary continuously between the sections. For instance, some embodiments may provide for the inner diameter of the carrier insert 42 to vary across certain portions of a thickness of the carrier insert (e.g., from an upper portion of the carrier insert 42 to a lower portion of the carrier insert 42). For instance, as perhaps best shown in FIG. 4, the inner diameter of the carrier insert 42 may vary linearly from a top portion of the annular protrusion 50 to a bottom portion of the main section 44. Such variance may facilitate the ability for the core rod 30 to be inserted and removed from association with the carrier assembly. However, the inner diameter of the carrier insert 42 may be generally consistent along at least a portion of the thread-forming portion 46.

The threaded protrusion 48 on the exterior radial surface of the thread-forming portion 46 of the carrier insert 42 may, in some embodiments, be formed with single lead threads, double lead threads, triple lead threads, or other multi-lead threads. For instance, the threaded protrusion 48 shown in the drawings comprise double lead threads, which include two leads winding around the exterior radial surface of the thread forming-portion 46. As such, and with reference to FIG. 6, the leads of the threaded protrusion 48 may each be formed with a lowermost starting point 54 and an uppermost ending point 56. In some embodiments, the lowermost starting points 54 will be located on a plane that bisects the thread-forming portion 46 and that includes a longitudinal axis of the thread-forming portion 46. Additionally, the uppermost ending points 56 may extend along the exterior radial surface of the thread-forming portion 46 past the plane that includes the lowermost starting point 54, such that the threads will be truncated at their lowermost starting points 54.

Figure 6:
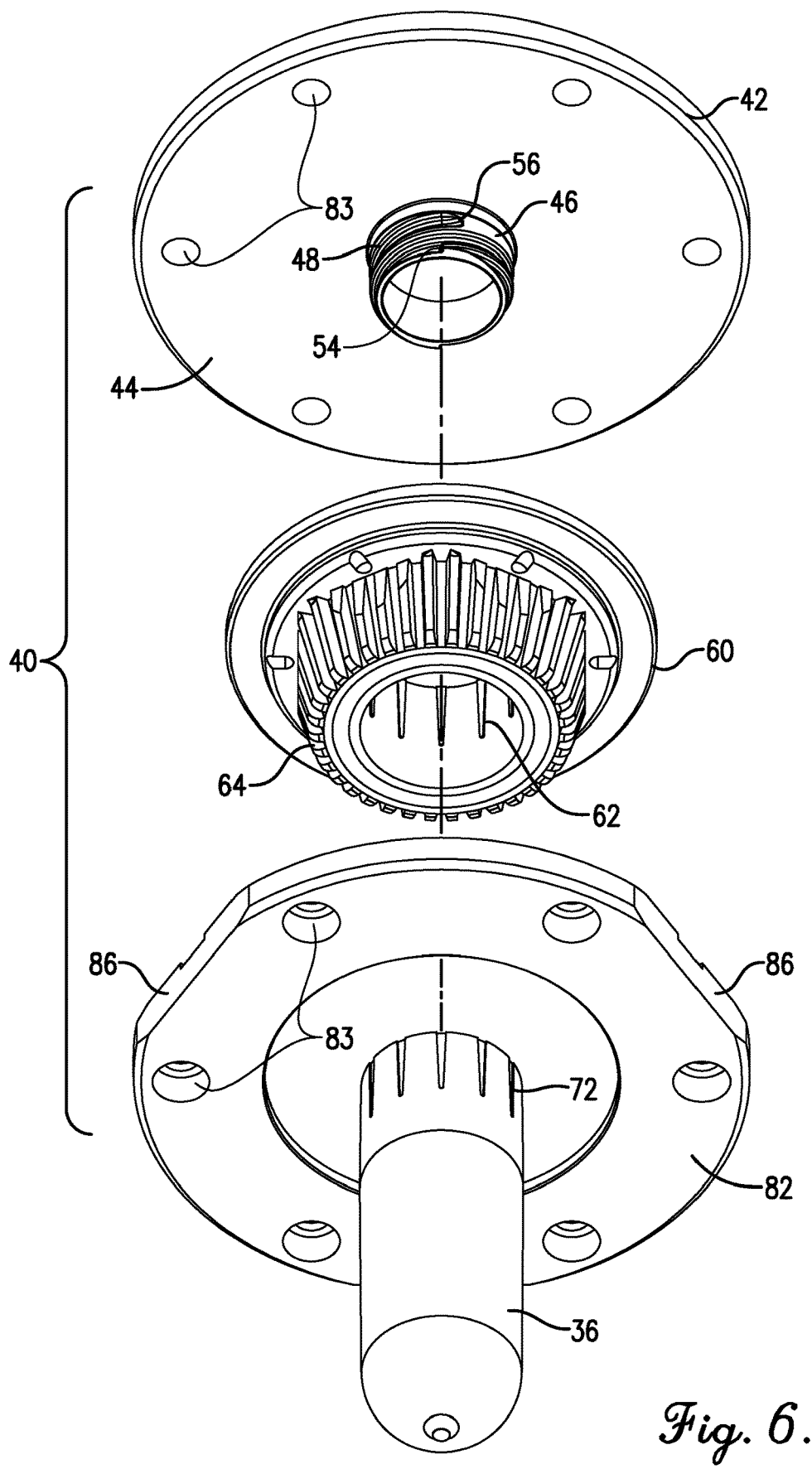
FIG. 6 is a bottom exploded view of the carrier assembly and parison from FIGS. 4-5.

With reference to FIGS. 2-6, the carrier assembly 40 may further comprises a pinion insert 60 that is configured to surround at least a portion of the threaded protrusion 48 of the thread-forming portion 46 of the carrier insert 42. In certain embodiments, such as illustrated in FIGS. 5-6 the pinion insert 60 will be formed as an annular hub having an interior radial surface and an exterior radial surface. In certain embodiments, the interior radial surface may include one or more slots or protrusions 62 extending longitudinally along the interior radial surface. In addition, as will be described in more detail below, the exterior radial surface may include one or more gear elements 64 formed thereon, such that the pinion insert 60 is configured to act as a pinion from a rack and pinion assembly.

With reference to FIG. 2, when positioned with the carrier insert 42 about the core rod 30, the pinion insert 60 may be spaced apart from the thread-forming portion 46 of the carrier insert 42, so as to present a thread-forming cavity 66 between the thread forming portion 46 and the interior radial surface of the pinion insert 60. The thread-forming cavity 66 may form a portion of the parison-forming cavity 34. As such, and as illustrated in FIGS. 3 and 4, molten resin injected into the parison-forming cavity 34 will flow into the thread-forming cavity 66 so as to form a neck portion of the parison 36 with a shape corresponding to the thread-forming portion 46 and the pinion insert 60. The resulting parison 36 will, thus, include internal threads 70 (in the form of threaded grooves) formed on the interior-surface of its neck portion, as is shown in FIGS. 4-5, with such internal threads 70 corresponding to the threaded protrusion 48 from the carrier insert 60. In addition, resulting parison 36 will include longitudinal protrusions and/or slots 72 formed on the exterior surface of the parison's 36 neck portion, as is shown in FIGS. 4-6, with such protrusions and/or slots 72 corresponding to the slots and/or protrusions 62, respectively, of the pinion insert 60. Specifically, a slot 62 on the pinion insert 60 will form a protrusion 72 on the parison 36, while a protrusion 62 on the pinion insert 60 will form a slot 72 on the parison 36.

As will be described in more detail below, the slots and/or protrusions 62 of the pinion insert 60 will be operable to engage a portion the corresponding protrusions and/or slots 72 formed on the exterior surface of the neck portion of the parison 36, such that the pinion insert 60 is operable to engage with and the parison 36 once the parison 36 has been formed. Furthermore, embodiments provide for the pinion insert 60 to rotate with respect to the remaining components of the carrier assembly 40. Given that the pinion insert 60 is operable to be engaged with the parison via the slots and/or protrusion 62,72, a rotation of the pinion insert 60 will cause a corresponding rotation of the parison 36.

Returning to FIGS. 2-3, in certain embodiments, the carrier assembly 40 may further include a carrier plate 80 for securing the carrier insert 42 and the pinion insert 60 in position about the core rod 30. In some embodiments, the carrier plate 80 may be used in conjunction with a retainer ring 82 for surrounding and securing the carrier insert 42 and the pinion insert 60 in place. In some embodiments, as perhaps best shown in FIGS. 5 and 6, each of the retainer ring 82 and the carrier insert 42 and may include openings 83 for receiving fasteners (e.g., threaded bolts) to secure the retainer ring and the carrier insert 42 together, and in some embodiments, to the carrier plate 80. With reference to FIG. 5, the retainer ring 82 may also include a flange portion 84 for supporting at least a portion of the pinion insert 60 against the carrier plate 80 to secure the pinion insert 60 in place. Furthermore, the retainer ring 82 may include one or more flat edge sections 86 on its exterior radial edge. As will be described in more detail below, the flat edge sections 86 may facilitate the carrier insert 42 to remain generally stationary, while the pinion insert 60 is being rotated. In some alternative embodiments, in place of the retainer ring 82, the carrier plate 80 may include integral upper and lower portions, which function in a manner similar to the combination of the carrier plate 80 and the retainer ring 82 illustrated in the drawings.

Given the carrier assembly 40 used in conjunction with the core rod 30 and the mold 32, as described above, the injection process may be performed by injecting molten resin, such as PET or another thermoplastic resin, into the parison-forming cavity 34 cooperatively defined by the core rod 30 and the mold 32. The resin is injected in a heated, molten form, such that it will fill the parison-forming cavity 34, as shown in FIG. 3. The resin may remain within the parison-forming cavity 34 until it hardens to a point at which it can at least temporarily hold its shape in the form of a parison 36 when removed from the mold 32. As indicated above, embodiments of the present invention provide for a neck portion of the parison 36 to be formed with internal threads 70. Such internal threads 70 are formed by way of the resin's molding around the thread-forming portion 46 of the carrier insert 60. In particular, as the resin fills the thread-forming cavity 66 of the parison-forming cavity 34, which is presented between the thread-forming portion 46 of the carrier insert 42 and the pinion insert 60, the resin will cool to form a neck of the parison 36, with such neck including internal threads 70.

Figure 7:
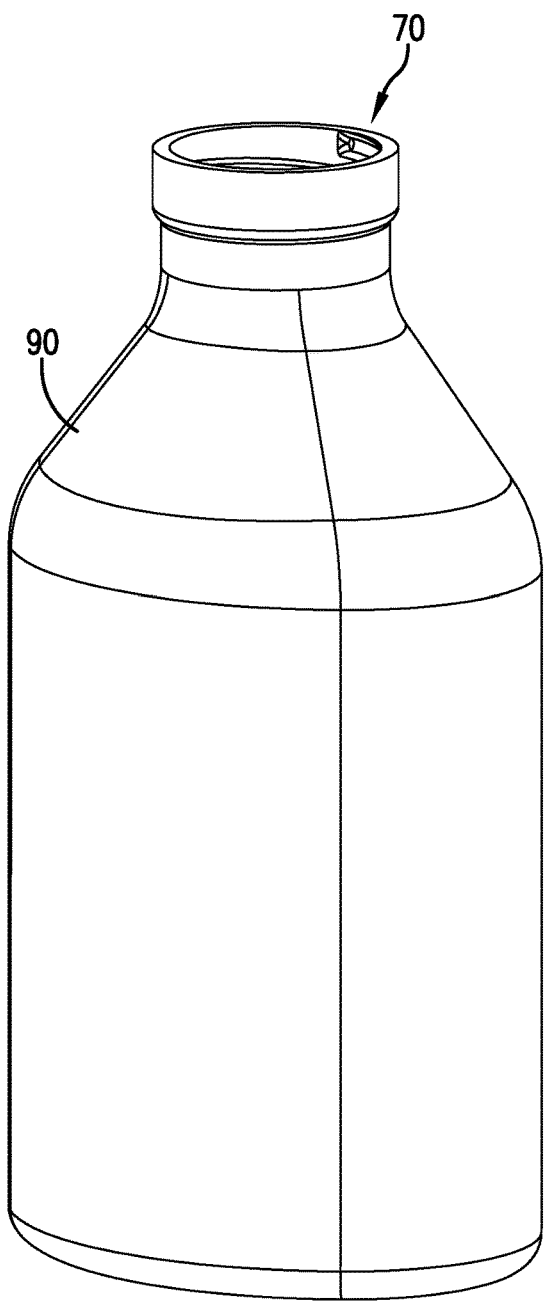
FIG. 7 is a perspective view of a molded article with internal threads made according to embodiments of the present invention.
Figure 8:
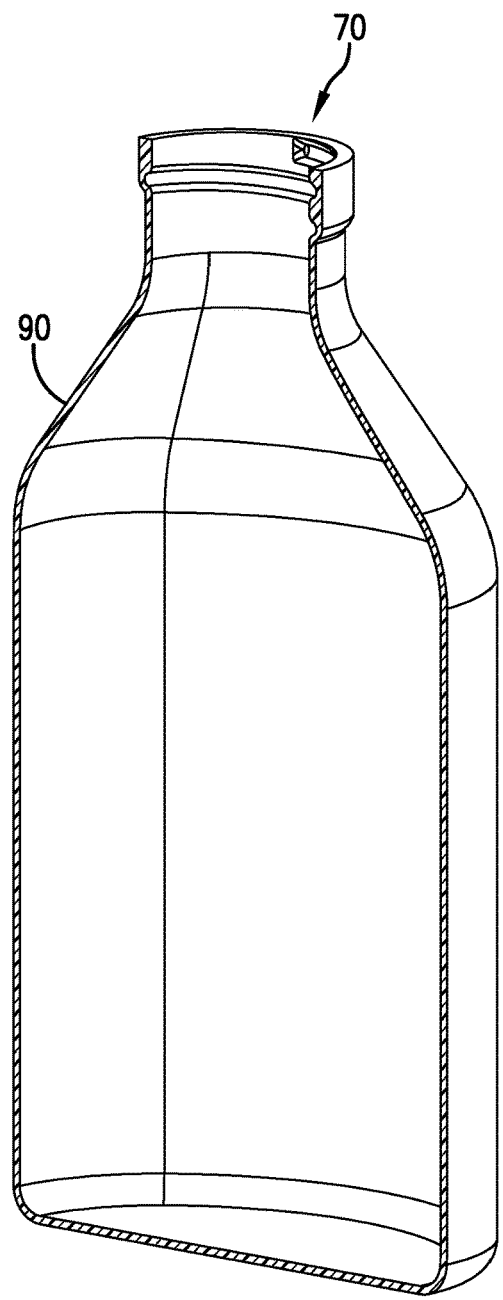
FIG. 8 is a cross-section of the molded article from FIG. 7.

Once the parison 36 has sufficiently cooled so as to retain its shape, the parison 36 will be transferred to the conditioning station 16 (for the 4-stage ISBM machine) or to the stretch blow station 18 (for the 3-stage ISBM machine). Embodiments of the present invention will provide for the parison 36 to be transferred via the carrier assembly 40 that secures the parison 36 by its neck portion. In particular, the core rod 30, which was used at the injection station 12, will be removed such that the parison 36 will be supported between the carrier insert 42 and the pinion insert 60 (with the carrier insert 42 and the pinion insert 60 being supported by the carrier plate 80). Once transferred to the conditioning station 16 (if applicable), the parison 36 may undergo various conditioning processes, such as heating, which will prepare the parison 36 for being properly stretch blow molded into a molded article at the stretch blow station 18. From the conditioning station 16, the parison will be transferred to the stretch blow station 18 via the carrier assembly 40. At the stretch blow station 18, the parison 36 will be stretch blown to form the molded article. In particular, the stretch blow station 18 will insert a stretch rod into the parison 36, with the stretch rod being operable to provide radial and axial stretching to the parison 36 while air is simultaneously blown into the parison 36. As such, the parison will be stretch blown into a molded article, such as molded article 90 shown in FIGS. 7 and 8, which corresponds to a mold cavity of the blow molds used at the stretch blow station 18. Beneficially, the final molded article 90 will include internal threads 70 formed on its neck portion. As such, embodiments of the present invention include a stretch blow molded article 90 comprising a body and a neck extending from the body and presenting an opening for fluidly connecting an exterior of the molded article 90 to an interior of the body. As shown in FIGS. 7 and 8, the neck includes an interior radial surface an exterior radial surface, with the interior radial surface including threads 70 formed thereon. Corresponding with the threaded protrusion 48 of the carrier insert 42, the threads 70 formed on the interior radial surface of the neck may comprise double lead threads. Furthermore, to correspond with some embodiments of the threaded protrusion 48 of the carrier insert 42, the threads 70 formed on the interior surface of the molded article's 90 neck may have a lowermost starting point and an uppermost ending point, with the lowermost starting points being located on a plane that bisects the neck and that include a longitudinal centerline of the neck. Further, the uppermost ending points may extend along the molded article's 90 neck past the plane that includes said lowermost starting point.

Upon forming the molded article at the stretch blow station 18, the molded article will be transferred, via the carrier assembly 40, to the ejection station 20. It is noted that the molded article 90 illustrated in FIGS. 7-8 is purely exemplary, and the molded articles formed according to embodiments of the present invention may be formed in any shape required and as defined by the blow molds of the stretch blow station 18.

In standard ISBM machines, the ejection station 20 generally comprises a stripper plate, an ejection rod, or any other device configured for pushing, pulling, dumping, or otherwise stripping the molded article from the thread splits and/or carrier plate once the molded article has been blow molded. However, the molded article of embodiments of the present invention is threadedly secured to the carrier assembly 40 between the carrier insert 42 and the pinion insert 60. As such, to eject the molded article, the molded article must be rotated such that it is twisted off of the thread-forming portion 46 of the carrier insert 42.

Figure 9:
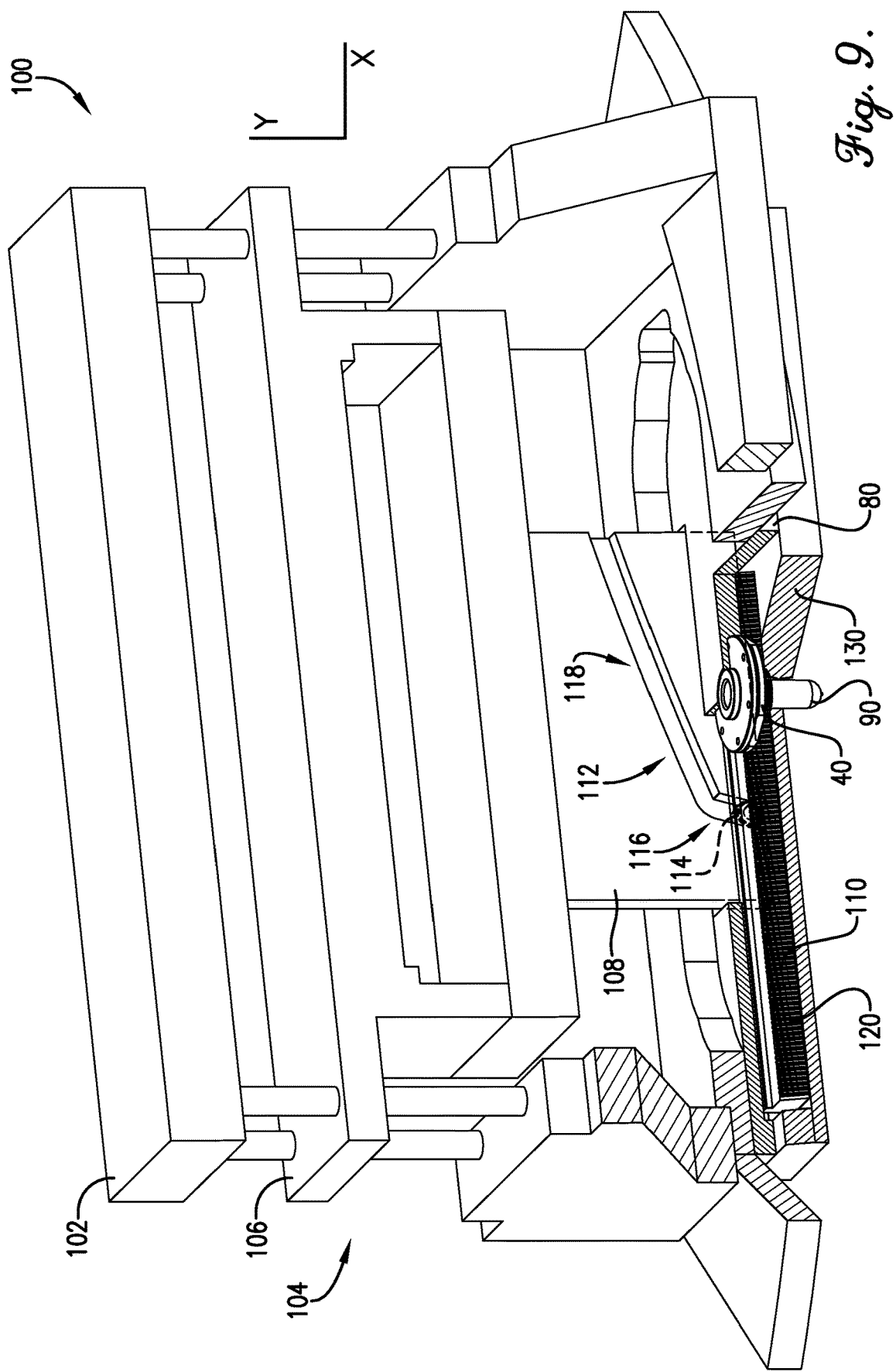
FIG. 9 is a front perspective view of ejection station tooling according to embodiments of the present invention, with part of a bottom portion of the tooling cut away to particularly show a cam plate and a rack, as well as to shown the carrier assembly from FIGS. 4-6 being associated with the ejection station tooling.

To accomplish such rotation of a molded article with internal threads 70, such as molded article 90 shown in FIGS. 7-8, embodiments of the present invention include ejection station tooling 100 illustrated in FIGS. 9-14. With reference to FIG. 9, the ejection station tooling 100 of embodiments of the present invention may comprise a base 102 and an actuation assembly 104 associated with the base 102 and operable to actuate certain components of the ejection station tooling 100, so as eject an internally-threaded molded article 90 that is engaged with the carrier assembly 40. The actuation assembly 104 may comprise a hydraulic, a pneumatic, or an electromechanically-actuated actuator component 106 configured to actuate a plate 108 in a first dimension (e.g., a "Y" dimension directed vertically, such as upward and downward), and a bar 110 configured to actuate in a second dimension (e.g., an "X" dimension directed horizontally, such as left and right) in response to the actuation of the plate 108. In some embodiments, the first and second dimensions will be orthogonal to each other. As such, the ejection station tooling 100 is operable to remove the molded article 90 from the carrier assembly 40 by causing the molded article to rotate with respect to a portion of the carrier assembly 40, as will be described in more detail below.

Figure 10:
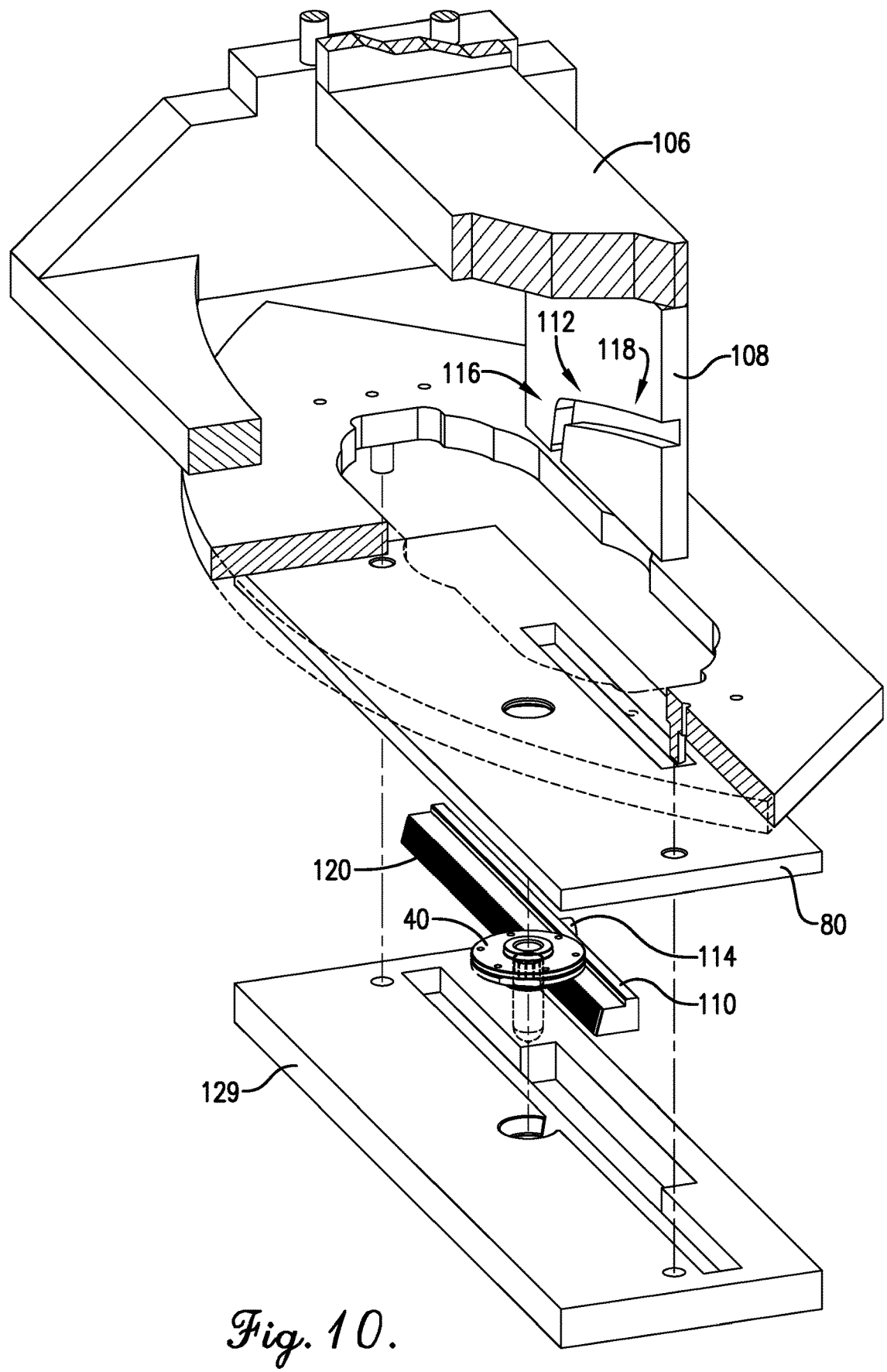
FIG. 10 is a partial side exploded view of the ejection station tooling from FIG. 9, with a top portion of the tooling cutaway.
Figure 11:
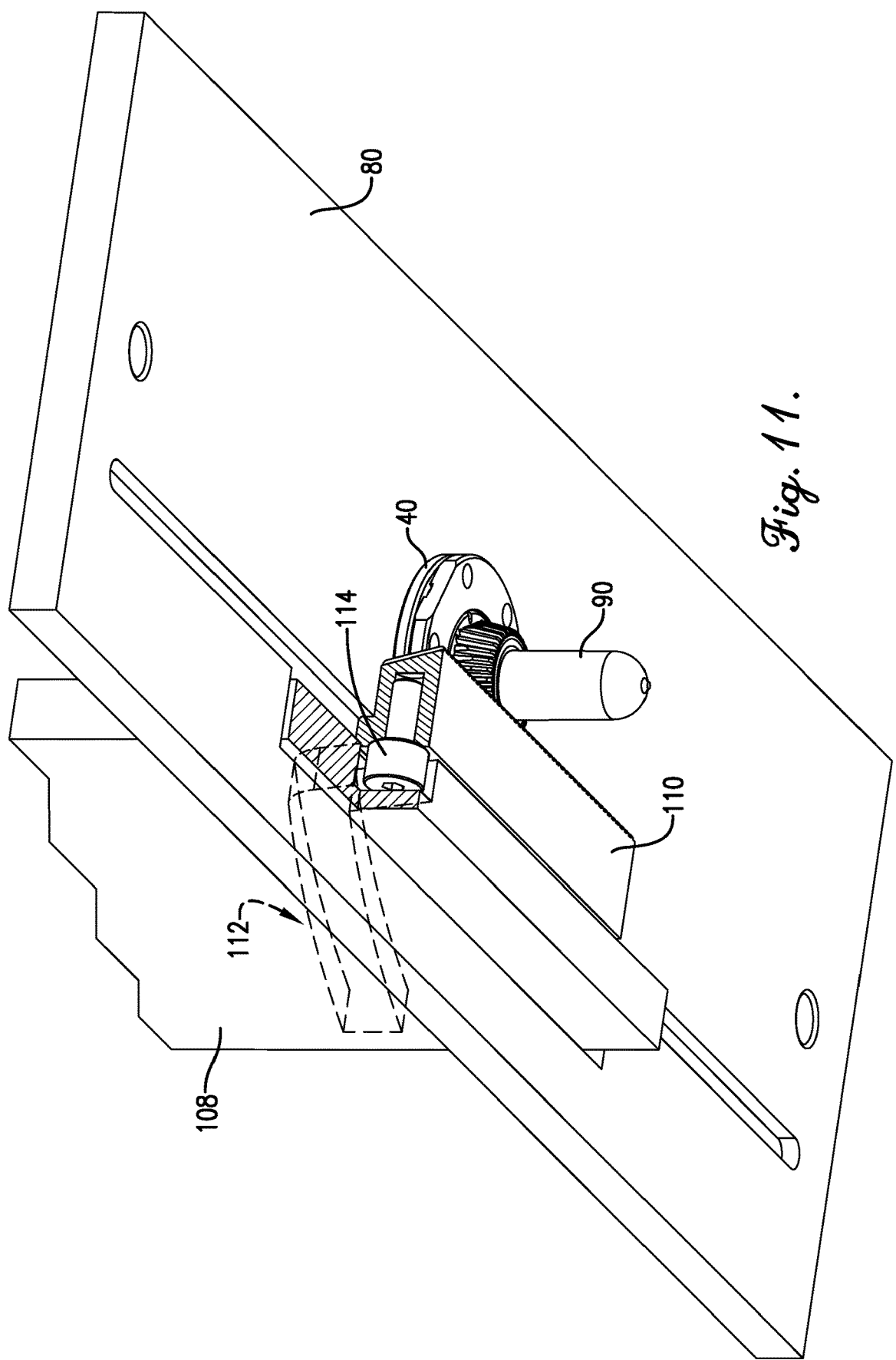
FIG. 11 is a bottom rear perspective view of the tooling from FIGS. 9-10, with part of the bottom portion of the tooling removed to particularly shown the cam plate the rack, and a roller, as well as to show the carrier assembly from FIGS. 4-6.

In some embodiments, the plate 108, which is secured to the actuator component 106 of the ejection station tooling 100, may comprise a cam plate. In particular, the cam plate 108 is operable to actuate in the first dimension in response to the actuation of the actuator component 106. For instance, as the actuator component 106 actuates in a downward direction, the cam plate 108 will similarly actuate in the downward direction. With reference to FIGS. 9-10, the cam plate 108 may include a groove 112 extending through at least a portion of the cam plate's 108 surface. Furthermore, as perhaps best shown in FIG. 11, the ejection station tooling 100 may further comprise a roller 114 rotatably connected to the bar 110 and operable to travel through the groove 112 of the cam plate 108 in response to the actuation of the cam plate 108. In more detail, and with reference to FIG. 9, as the cam plate 108 actuates in the first dimension (e.g., vertical), the roller 114 is configured to actuate through the groove 112, with such actuation including actuation in the second dimension (e.g., horizontal). Specifically, the groove 112 may comprise a first portion 116 and a second portion 118. As the cam plate 108 is actuated downward, the roller 114 first actuates through the groove 112 in the direction indicated in FIG. 12, with the roller 114 initially travelling through the first portion 116 of the groove 112 and then through the second portion 118 of the groove 112.

Figure 12:
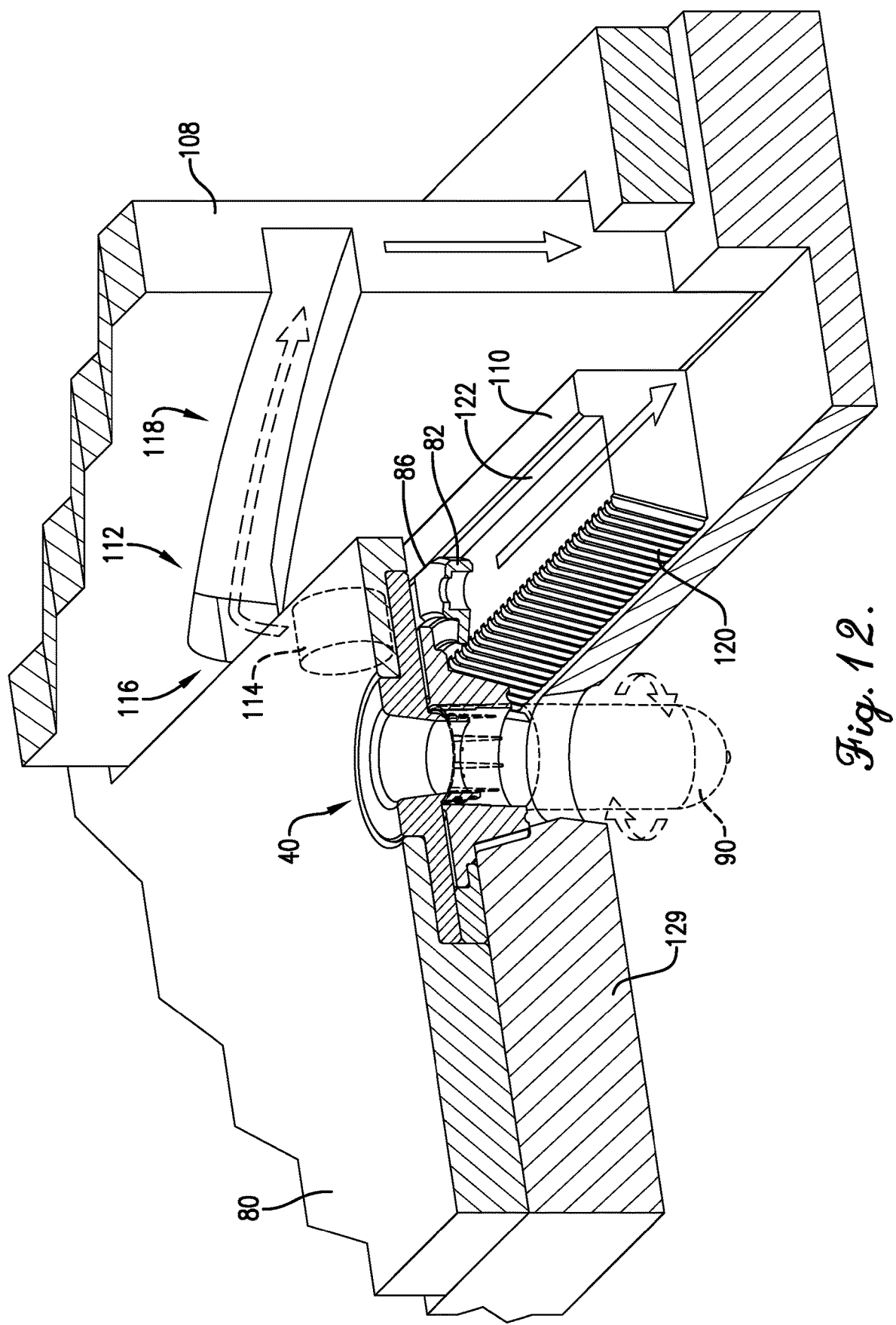
FIG. 12 is a partial side perspective view of the tooling from FIGS. 9-11, with a portion of the tooling cutaway to particularly show the cam plate operable to actuate in a first dimension, the roller and the rack operable to actuate in the second dimension, and a portion of the carrier assembly configured to rotate in response to the actuation of the rack.

With reference to FIG. 12, the bar 110 of the ejection station tooling 110 may comprises a rack with gear elements 120 formed thereon. Because the rack 110 is coupled with the roller 114, as the roller 114 actuates through the groove 112 in the second dimension (e.g., horizontal), the rack 110 correspondingly actuates in the second dimension. It should be understood that the rack 110 and the roller 114 are held secure in the first dimension (e.g., vertical) via the carrier plate 80 and via a bottom plate 129 associated with the ejection station tooling 100. As such, although the rack 110 and roller 114 are capable of actuating in the second dimension in response to the cam plate's 108 actuation in the first dimension, the rack 110 and roller 114 are restricted from actuating in the first dimension. Given the components described above, the ejection station tooling 100 is operable to remove the molded article that is engaged with the carrier assembly 40.

Figure 13:
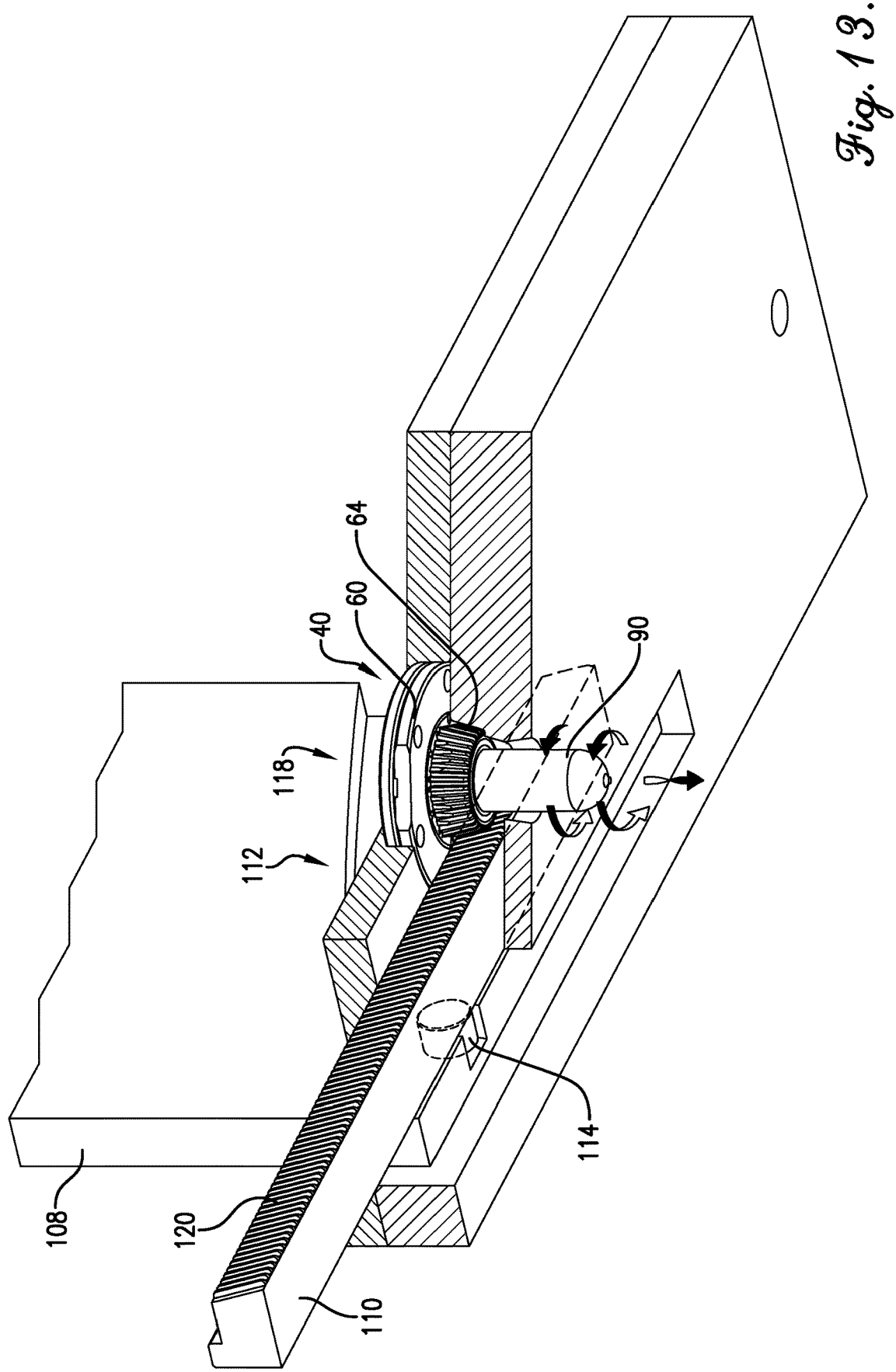
FIG. 13 is an additional partial side perspective view of the tooling from FIGS. 9-12, with a portion of the tooling cutaway to particularly show a molded article being rotated in response to the rotation of the portion of the carrier assembly.
Figure 14:
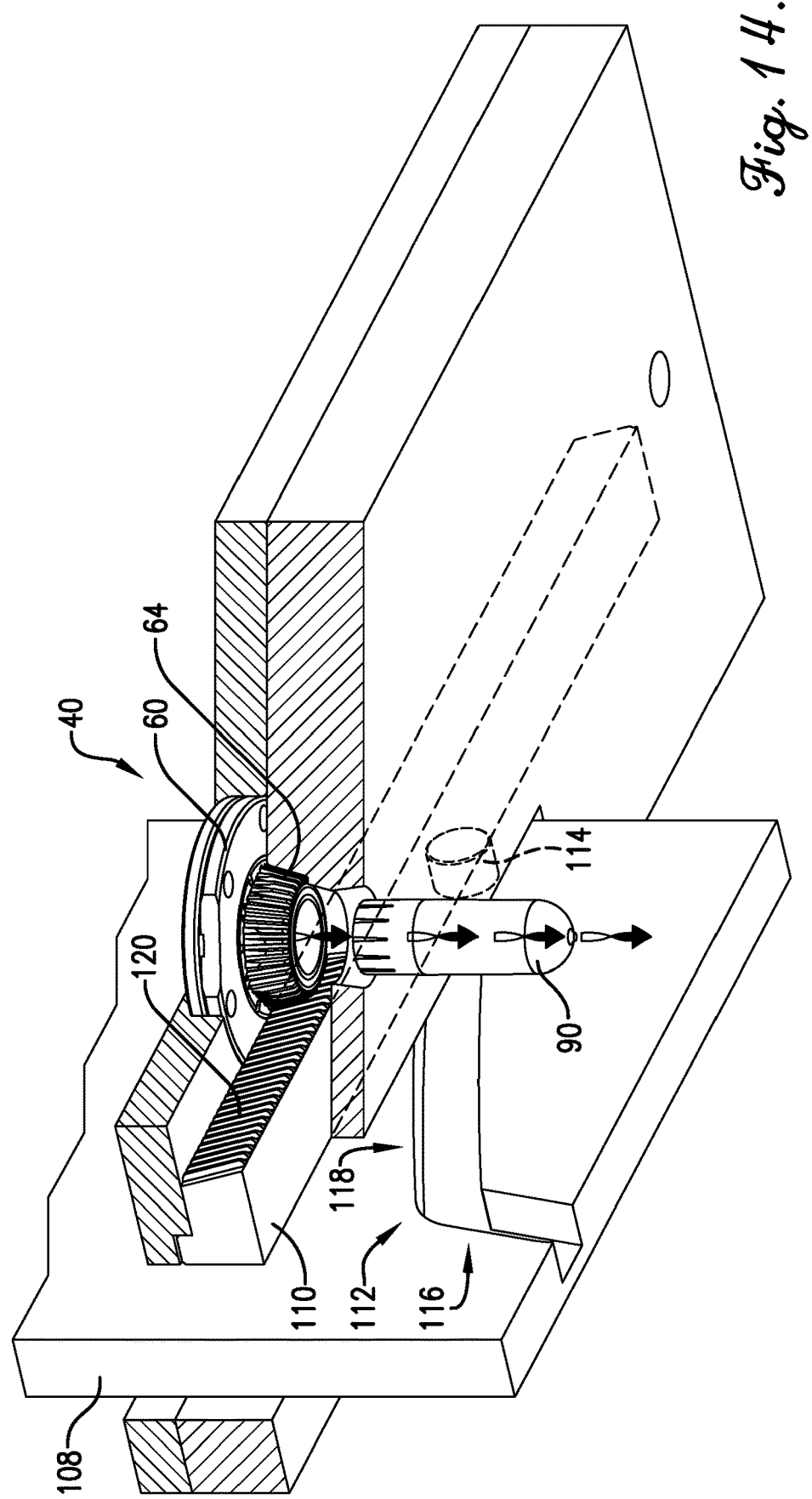
FIG. 14 is an additional partial side perspective view of the tooling from FIG. 13, with the portion of the tooling cutaway to particularly show the molded article being ejected in response to the rotation of the portion of the carrier assembly.

In more detail, and with reference to FIGS. 12-14, the gear elements 120 of the rack 110 are configured to engage with the gear elements 64 (not shown in FIG. 12) of the pinion insert 60 of the carrier assembly 40. With cam plate 108 actuating in the first dimension (e.g., downward), and the roller 114 and the rack 110 actuating in the second dimension in response (e.g., left to right), the actuation of the rack 110 is operable to cause a corresponding rotation of the pinion insert 60 of the carrier assembly 40. For instance, FIG. 13 illustrates the cam plate 108 in an upper-most position, such that the roller 114 is positioned in the first portion 116 of the groove 112 and the rack 110 is in a left-most position. Alternatively, FIG. 14 illustrates the cam plate 108 in a downward-most position, such that the roller 114 is positioned in the second portion 118 of the groove 112 and the rack 110 is in a right-most position. During the actuation of the rack 110 from the left-most to the right-most positions, the gear elements 120 of the rack 110 engage with the gear elements 64 of the pinion insert, to thereby cause the pinion insert 60 to rotate.

Furthermore, because the pinion insert 60 is engaged with the molded article 90, via the slots and/or protrusions 62 on the pinion insert 60 and the protrusions and/or slots 72, respectively, on the molded article 90, rotation of the pinion insert 60 is operable to cause a corresponding rotation of the molded article 90. By providing a sufficient rotation of the molded article 90, as shown in FIGS. 12-14, the molded article 90 will be twisted off the thread-forming portion 46 of the carrier insert 42. Specifically, the molded article 90 will be twisted off the thread-forming portion 46 and will simultaneously be forced downward along the interior radial surface of the pinion insert 60 (including along the slots and/or protrusions 62 formed thereon). In some embodiments, once the molded article 90 has been separated from the thread-forming portion 46 of the carrier insert 42, the molded article 90 will simply be allowed to fall downward, under the force of gravity, to be completely separated from the carrier assembly 40. In other embodiments, once the molded article has been separated from the thread-forming portion 46 of the carrier insert 42, the molded article can be separated from the pinion insert 60 via other standard methods and tooling, such as an ejection rod or any other device configured for pushing, pulling, dumping, or otherwise stripping the molded article from the pinion insert 60. Regardless, the ejection station tooling 100 described above provides for the molded article to be completely ejected from the carrier assembly 40.

To facilitate the ability of the pinion insert 60 and the molded article 90 to be rotated with respect to the carrier insert 42, as perhaps best shown in FIG. 12, one of the flat edge sections 86 of the retainer ring 82 can be aligned and positioned adjacent with a flanged upper portion 122 of the rack 110, such that the retainer ring 82 is restricted from rotating. Because the retainer ring 82 is coupled with the carrier insert 42 via fasteners, the flat edge sections 86 is configured to further prevent the rotation of the carrier insert 42 during rotation of the pinion insert 60.

In some embodiments, the cam plate 108 may comprise a stripper plate from a standard ISBM machine, which has been modified with the groove 112. As was previously described, the groove 112 of the cam plate 108 may comprise the first portion 116 and the second portion 118. The first portion 116 may extend further in the first dimension (e.g., vertically) than in the second dimension (e.g., horizontally), the second portion 118 may extends further in the second dimension than the first dimension. As such, when the roller 114 travels through first portion 116 of the groove 112, the rack 110 is operable to actuate in the second dimension at a first speed, such that the pinion insert 60 is operable to rotate at a first rotation rate. Alternatively, with the roller 114 travelling in said second portion 118 of the groove 112, the rack 110 is operable to actuate in the second dimension at a second speed, such that the pinion insert 60 is operable to rotate at a second rotation rate. As such, ejection station 20 provides for the molded article 90 to initially be rotated slowly when being removed from the carrier assembly 40, so as to avoid any breakages or interferences that may result from a quick initial rotation. Once the molded article 90 begins to rotate, the rotation rate can be increased so as to quickly eject the molded article 90 from the carrier assembly 40.

Figure 15:
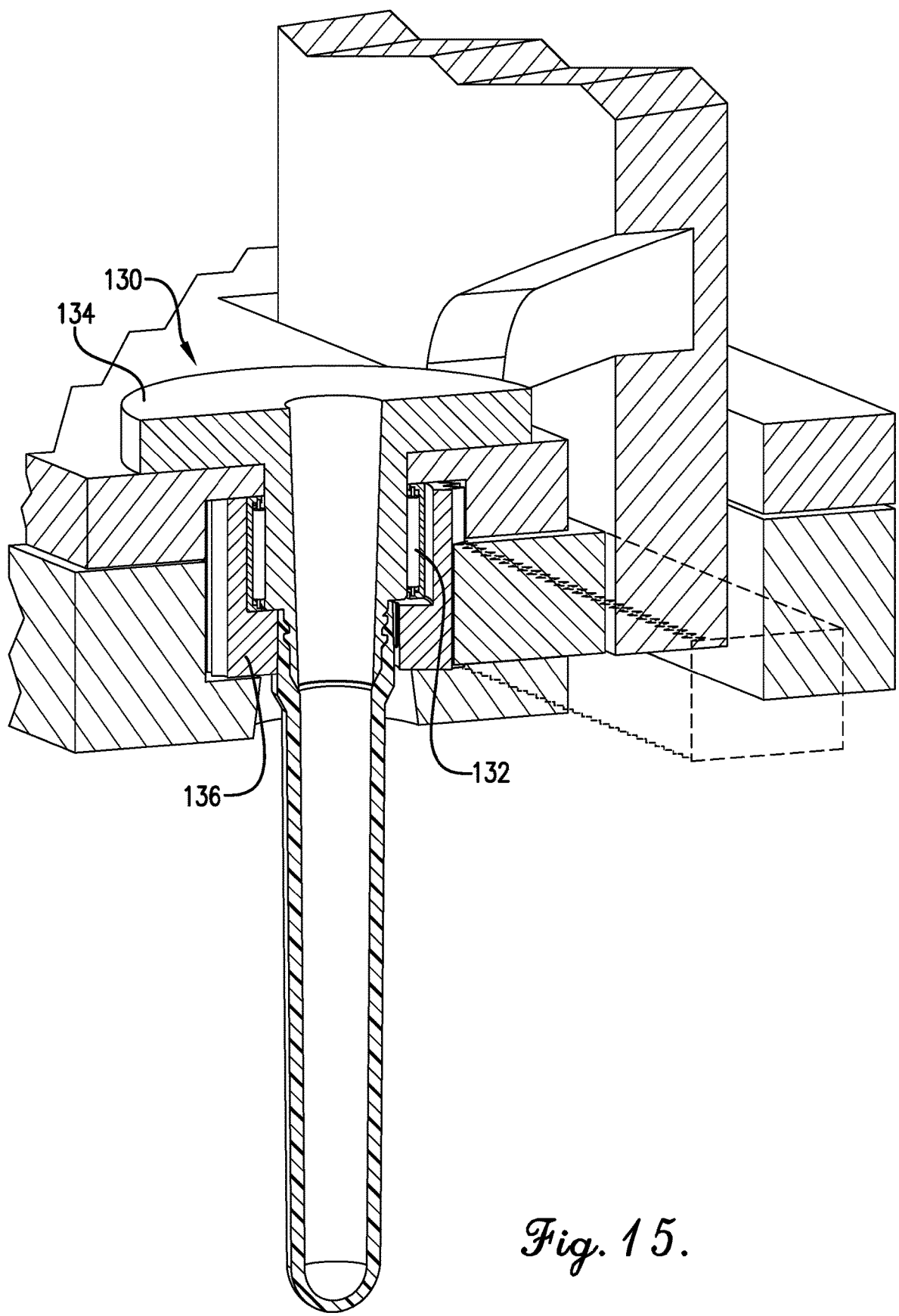
FIG. 15 is a partial side perspective view of ejection station tooling according to embodiments of the present invention, particularly showing a carrier assembly with bearing elements positioned between a carrier insert and a pinion insert.
Figure 16:
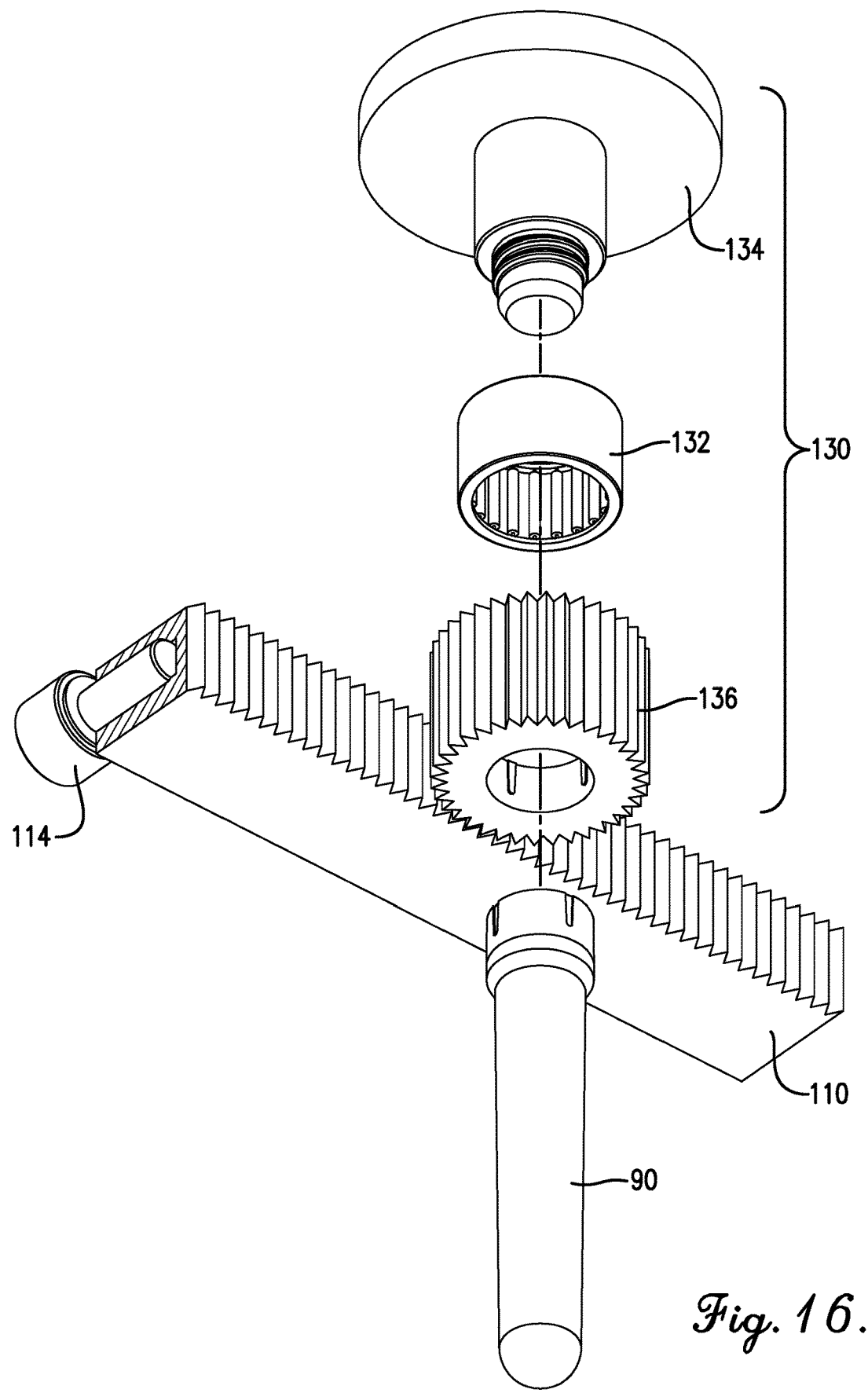
FIG. 16 is a bottom exploded view of the carrier assembly and portions of the tooling from FIG. 15.
Figure 17:
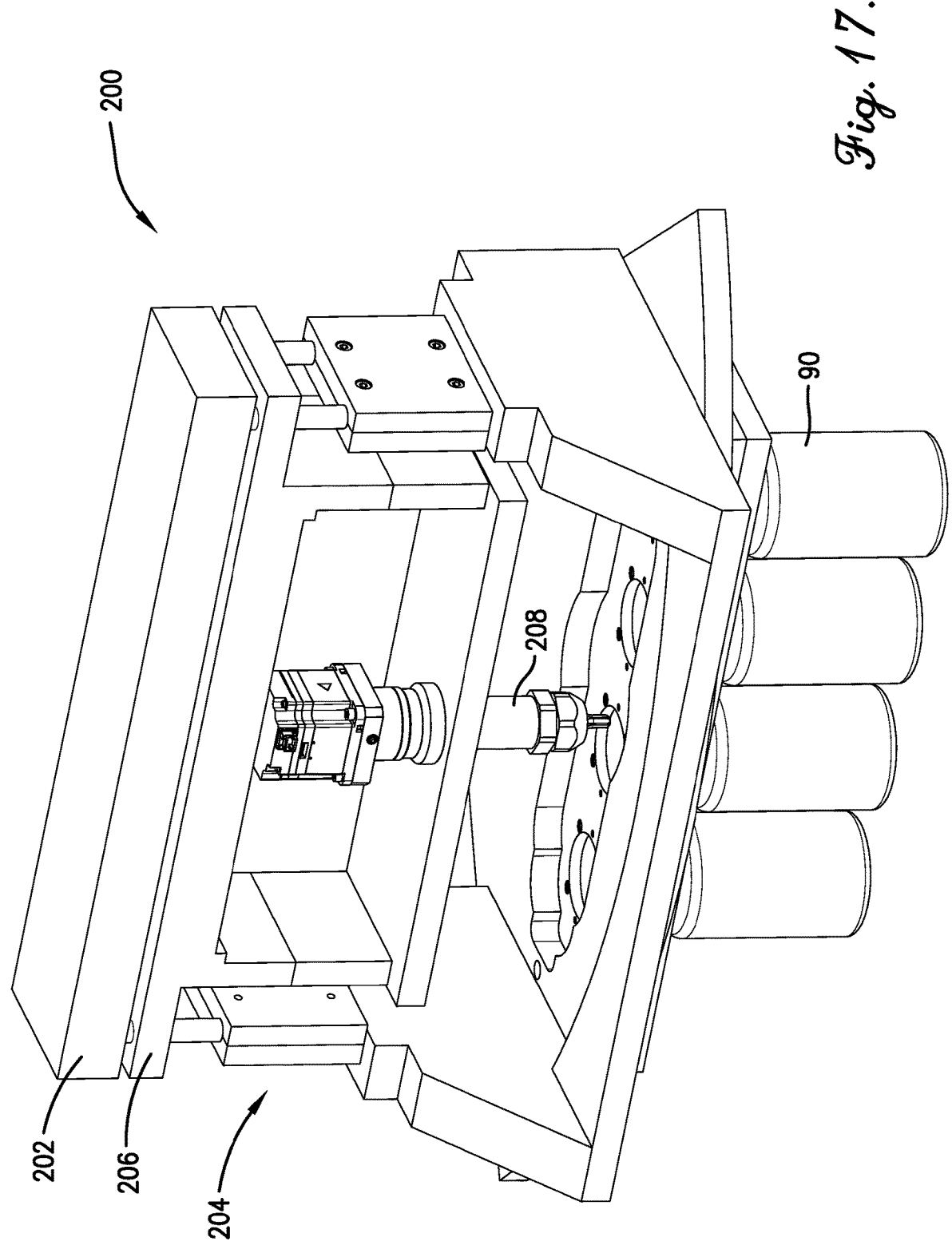
FIG. 17 is a front perspective view of ejection station tooling according to another embodiment of the present invention, with the ejection station tooling configured for removing internally-threaded molded articles from carrier assemblies.
Figure 18:
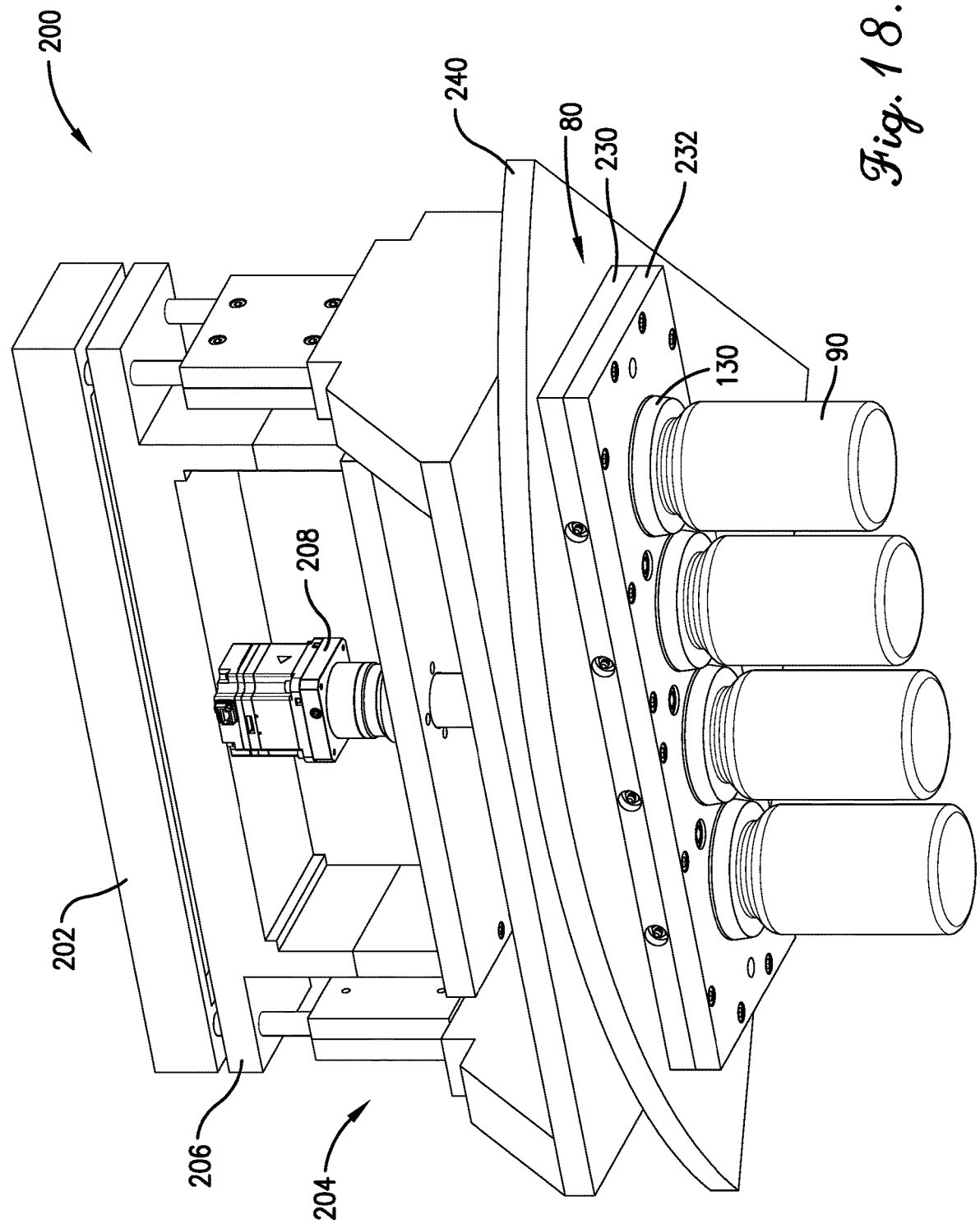
FIG. 18 is a bottom perspective view of the ejection station tooling from FIG. 17, illustrating a carrier plate supporting a plurality of carrier assemblies, with each of the carrier assemblies supporting an internally-threaded molded article.
Figure 19:
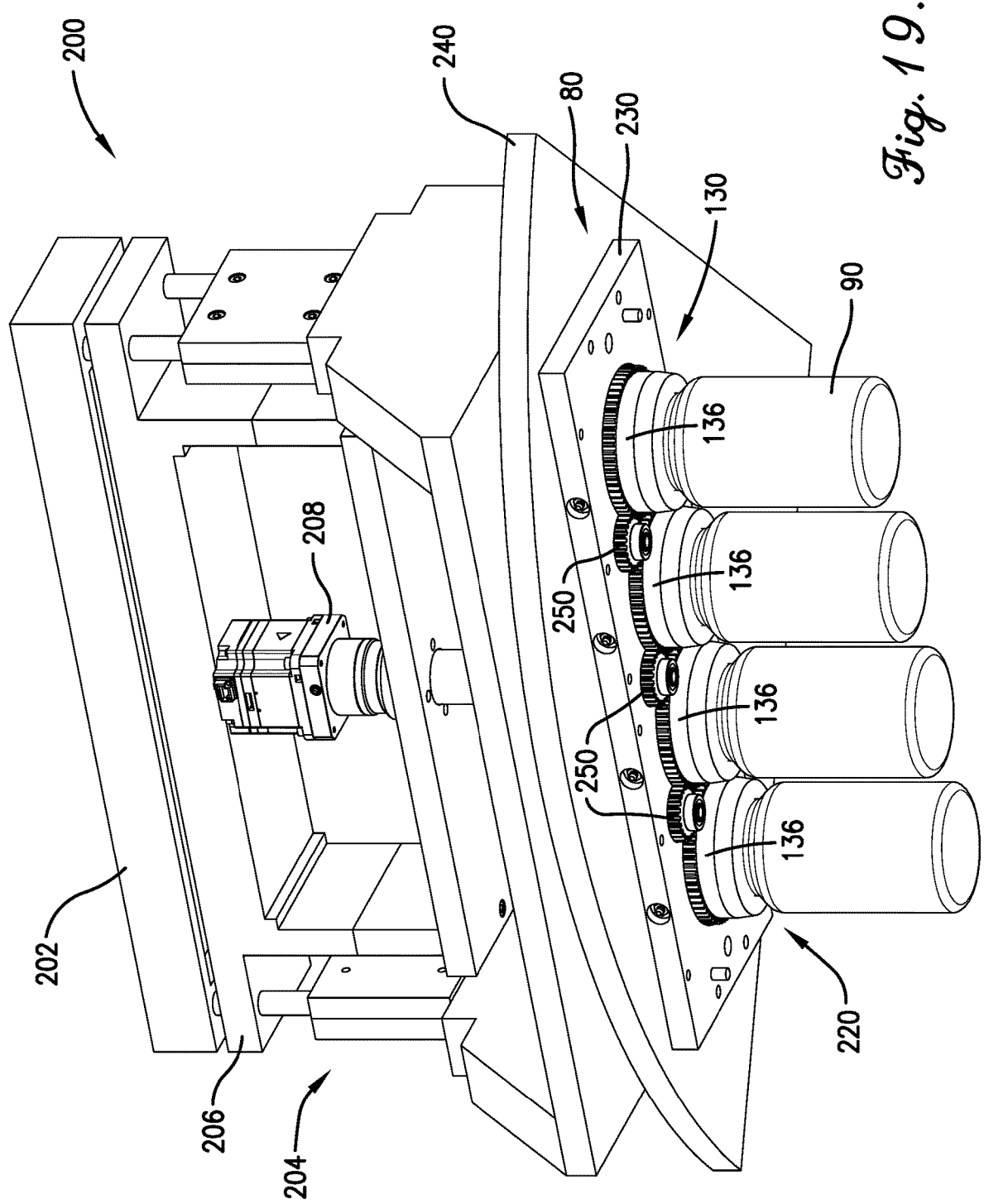
FIG. 19 is another bottom perspective view of the ejection station tooling from FIGS. 17 and 18, with a bottom portion of the carrier plate removed to illustrate the rotation assembly comprising a plurality of spur gears.

Although the invention has been described with reference to the preferred embodiment illustrated in the attached drawing figures, it is noted that equivalents may be employed and substitutions made herein without departing from the scope of the invention as recited in the claims. For example, in some embodiments, such as illustrated in FIGS. 15-16, an additional embodiment of a carrier assembly 130 may include one or more bearing-type elements 132, such as a bearing sleeve and/or a plurality of roller bearings, positioned between a carrier insert 134 and a pinion insert 136 so as to facilitate rotation of the pinion insert 136 about the carrier insert 134.

Embodiments of the present invention may include other variations of ejection station tooling for ejecting internally-threaded parisons or molded articles 90 from an ISBM machine 10. For example, FIGS. 17-22 illustrate ejection station tooling 200 that may be incorporated as part of an ISBM machine 10. As with the previously-described ejection station tooling 100, the ejection station tooling 200 may be used to eject parisons or articles 90 having internal threads.

In more detail, and remaining with FIGS. 17-21, the ejection station tooling 200 may comprise a base 202 and an actuation assembly 204 associated with the base 202 and operable to shift or otherwise actuate certain components of the ejection station tooling 200. As such, the ejection station tooling 200 may eject internally-threaded molded articles 90 that are engaged with carrier assemblies, such as carrier assemblies 40, 130 described above. In more detail, the actuation assembly 204 may comprise a hydraulic, a pneumatic, or an electromechanically-actuated actuator component 206 that is configured to vertically shift a drive mechanism 208 upward and downward. In some embodiments, the drive mechanism 208 may comprise a rotating actuator or driver configured to rotate a bit tip 210 (See FIG. 20). The drive mechanism 208 may be electrically-powered via an electric motor 212 (See FIGS. 20 and 21). However, it should be understood that the drive mechanism 208 may be powered by other power sources, such as pneumatic, hydraulic, or mechanical power sources.

The ejection station tooling 200 is configured to eject one or more internally-threaded molded articles 90 from the injection stretch blow molding machine 10 by causing the articles 90 to be rotated out of engagement with their respective carrier assembly 130. Such rotation may be facilitated via a rotation assembly 220 (See FIGS. 19-22) associated with and/or integrated within the carrier plate 80 that supports the carrier assemblies 130. In some embodiments, the rotation assembly 220 may form part of, or otherwise be considered part of, the actuation assembly 204. In more detail, as illustrated in FIGS. 18-21, the carrier plate 80 may comprise an upper portion 230 and a lower portion 232, which are configured to secure a row of one or more carrier assemblies 130. As shown in the drawings, in some embodiments, a row may include at least four carrier assemblies 130. The carrier plate 80 will generally be secured to the rotation plate 240, such that the carrier assemblies 130 can be rotated to each of the stations of the ISBM machine 10.

Figure 23:
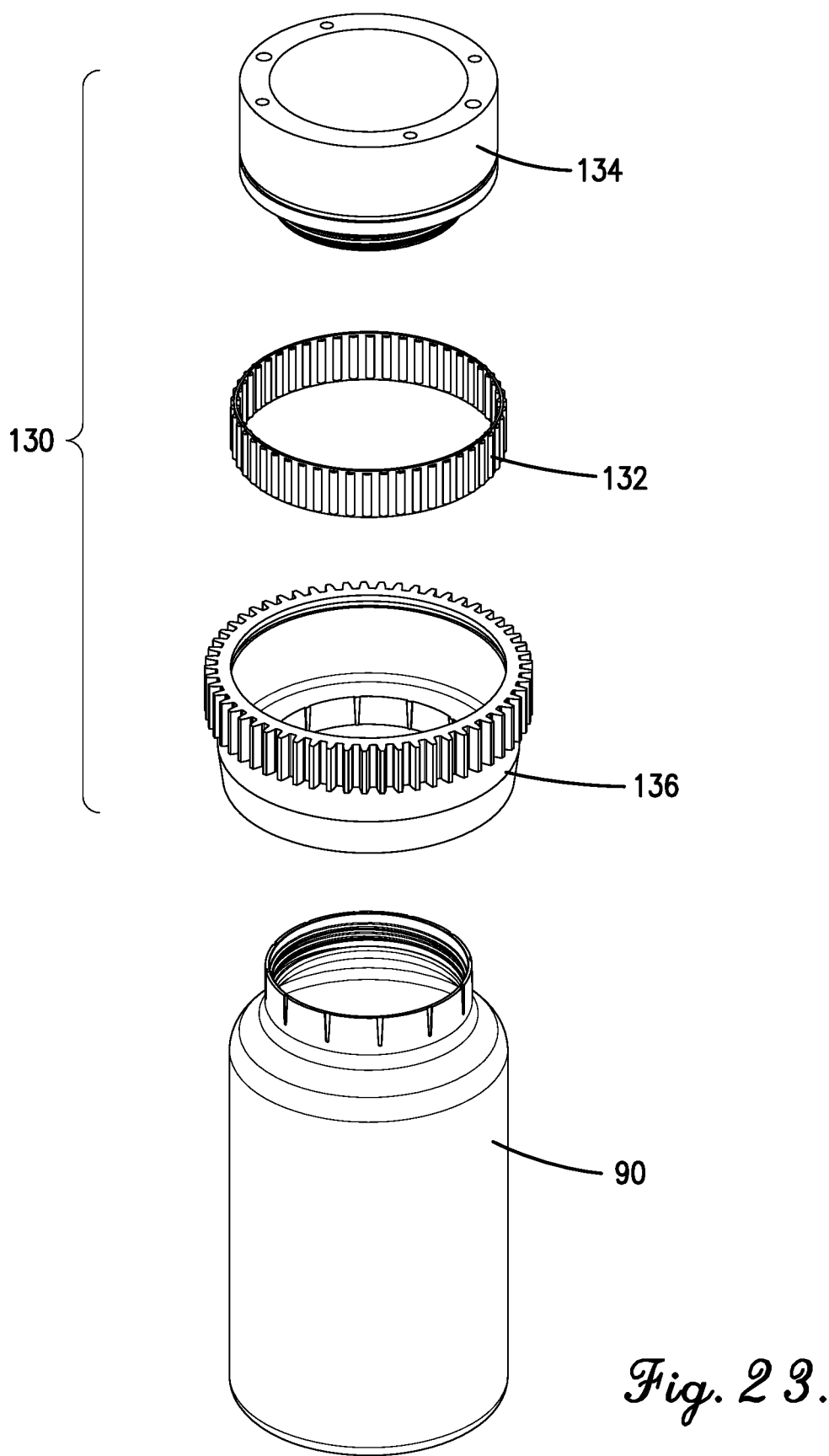
FIG. 23 is an exploded view of a carrier assembly for supporting an internally-threaded molded article.
Figure 24:
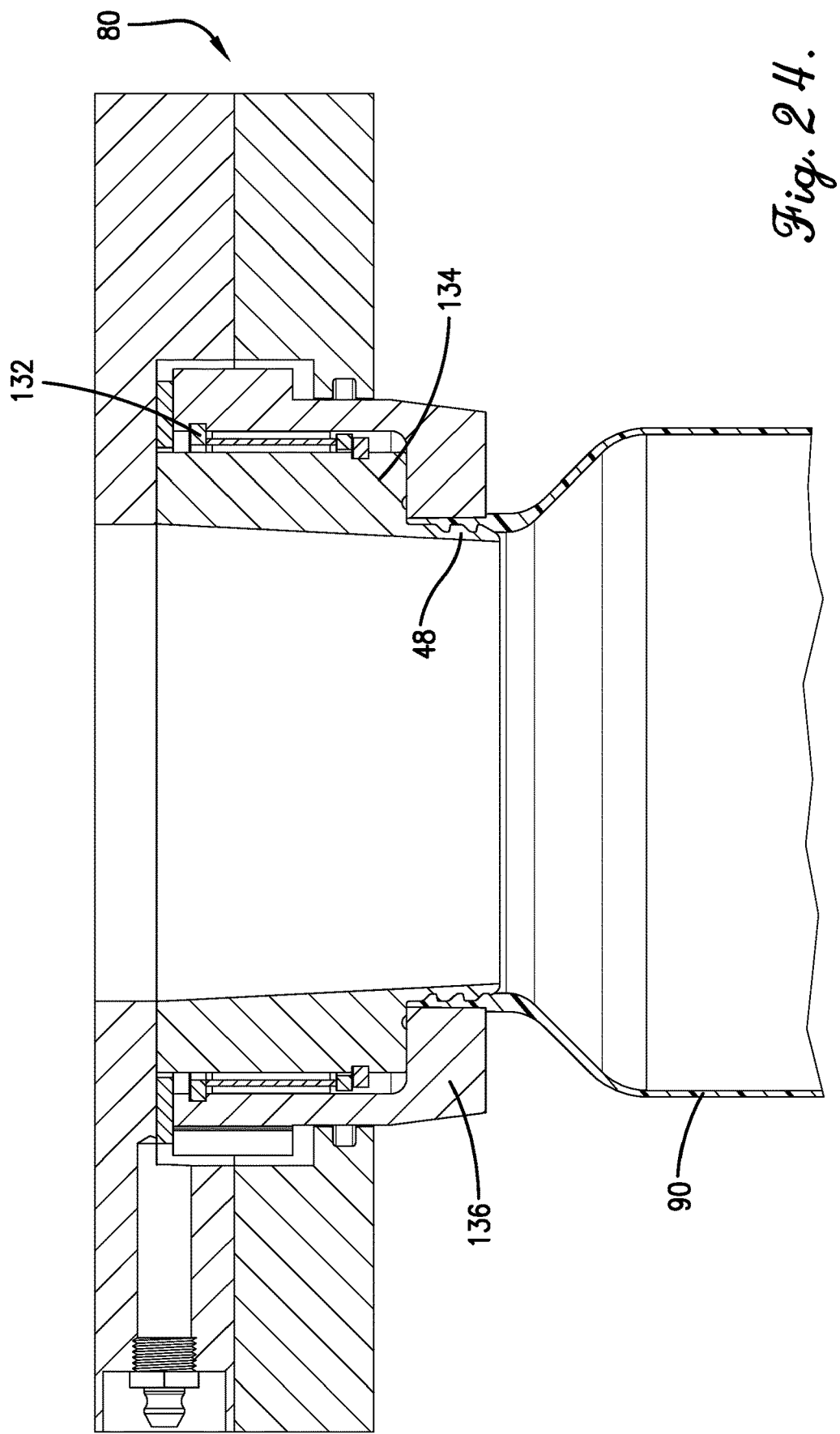
FIG. 24 is a cross section of the carrier assembly from FIG. 23 secured to a carrier plate, and particularly illustrating the carrier assembly supporting the internally-threaded molded article.

To remove the molded articles 90 from their respective carrier assembly 130, the rotation assembly 220 of the ejection station tooling 200 can be used to rotate the molded articles 90 such that they are disengaged with the carrier assemblies 130. As shown in FIG. 23, some embodiments may provide for each of the molded articles 90 to be secured to a carrier assembly 130, which as described previously, includes a rotatable pinion insert 136 separated from a carrier insert 134 by a bearing-type element 132. The carrier insert 134 is generally configured to be secured in a rigid manner to the carrier plate 80 (See FIG. 24). As such, the pinion insert 136 is free to rotate with respect to the carrier insert 134 and the carrier plate 80. The pinion insert 136 may include gear elements on its exterior radial surface, from which rotation can be imparted to the pinion insert 136, as will be discussed in more detail below. Furthermore, as was discussed previously for carrier assemblies 40, 130, the interior surface of the pinion insert 136 can include slots and/or protrusions, which can be used to respectively create protrusions and/or slots on the necks of the parison, and on the resulting article (e.g., molded article 90). As a result of the corresponding slots and protrusions, a rotation of the pinion insert 136 is configured to cause a corresponding rotation of the parison and/or molded article 90. Thus, with reference to FIG. 24, by rotating the pinion insert 136, an internally-threaded molded article 90 can be rotated out of engagement with the threaded protrusion 48 of the carrier insert 134 so as to be ejected from the carrier assembly 130 and, more generally, from the ISBM machine 10.

Turning back to FIGS. 19-22, some embodiments provide for the rotation assembly 220 to comprise a plurality of spur gears 250 engaged with the pinion inserts 136 of the carrier assemblies 130 held within the carrier plate 80. In particular, embodiments may provide for individual spur gears 250 to be positioned between each pair of adjacent carrier assemblies 130 such that one of the spur gears 250 can simultaneously engage with the pinion inserts 136 of adjacent carrier inserts 130. As such, the number of spur gears 250 required for the rotation assembly 220 may be dependent on the number of carrier assemblies 130 included within the carrier plate 80. For instance, as illustrated in FIGS. 19-22, embodiments that include four carrier assemblies 130 may require three spur gears 250. Additional carrier assemblies 130 may require a corresponding number of additional spur gears for operation.

Figure 20:
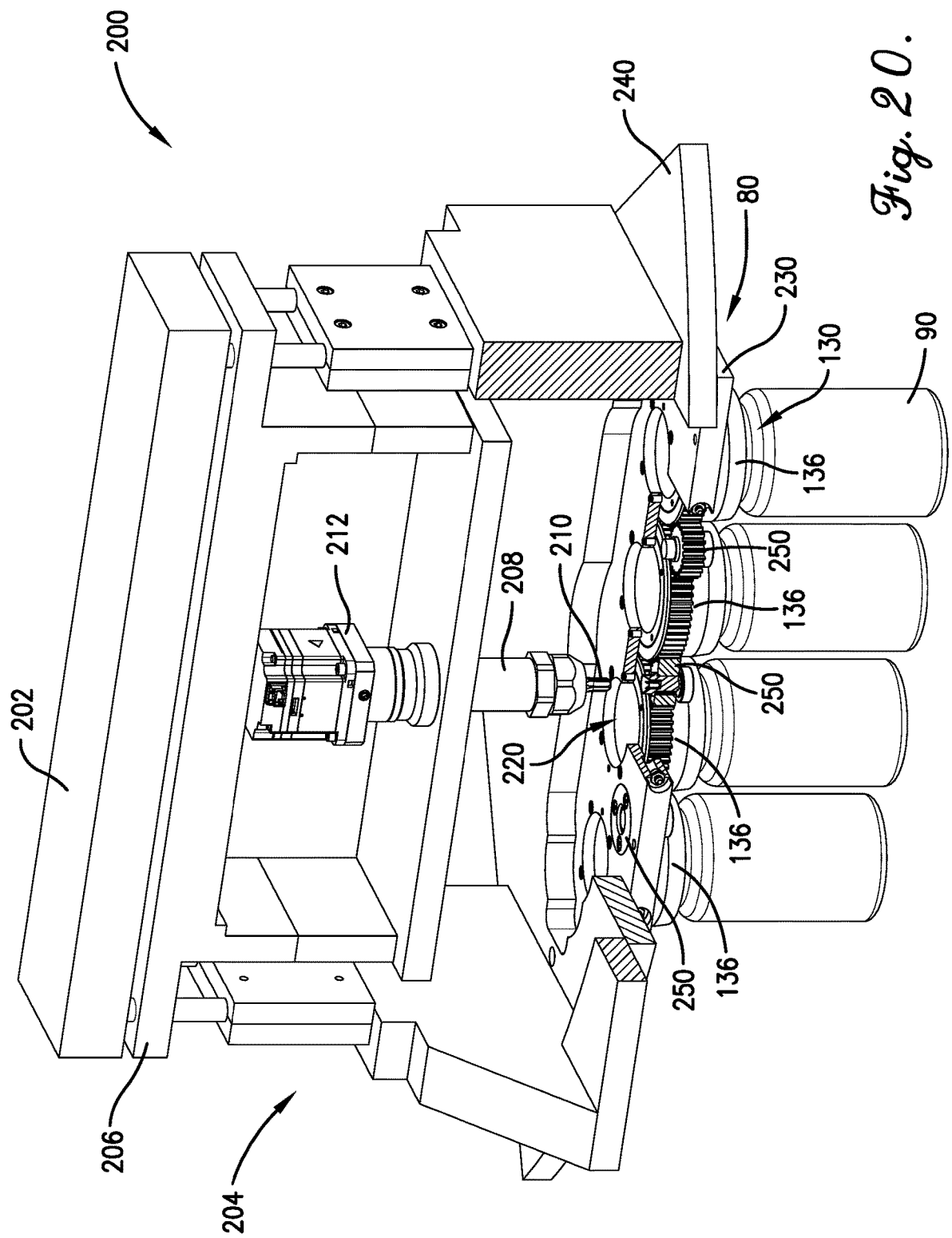
FIG. 20 is another top perspective view of the ejection station tooling from FIGS. 17-19, with bottom portions of the tooling cut away to illustrate the rotation assembly in more detail.
Figure 21:
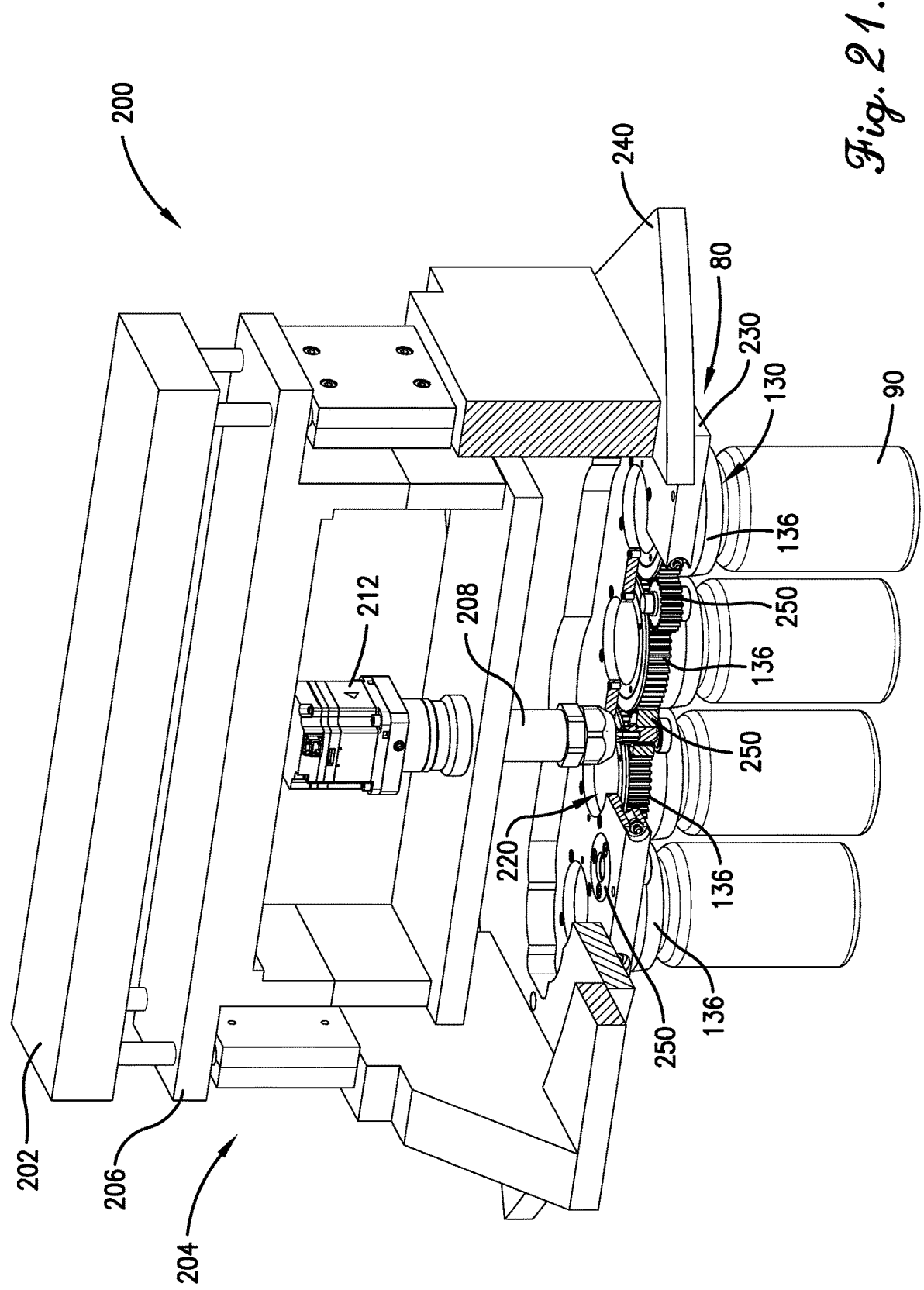
FIG. 21 is another top perspective view of the ejection station tooling from FIGS. 17-20, with bottom portions of the tooling cut away to illustrate the rotation assembly in more detail and with a drive mechanism lowered into engagement with one of the spur gears.

In such a configuration, rotation of one of the spur gears 250 can cause a corresponding rotation of each of the other spur gears 250 and of each of the pinion inserts 136 to which the spur gears 250 are engaged. For instance, as illustrated in FIGS. 20-21, a center one of the spur gears 250 may be rotated so as to cause a rotation of the pinion inserts 136 of the center pair of carrier assemblies 130 included within the carrier plate 80. Such pinion inserts 136 may include spur-type gear element on their outer/exterior surfaces, which match the gear elements of the spur gears 250. The center spur gear 250 may be rotated via the drive mechanism 208. Specifically, a top surface of the center spur gear 250 may include a female-mating surface that corresponds with the bit tip 210 of the drive mechanism 208. As such, the drive mechanism 208 can be vertically shifted (e.g., lowered) into engagement with the center spur gear 250 to cause rotation of the center spur gear 250. Rotation of the pinion inserts 136 of the center two carrier assemblies 130 will cause a corresponding rotation of the outer two spur gears 250 that are engaged therewith. Finally, rotation of the outer two spur gears 250 will cause a rotation of the pinion inserts 136 of the outer carrier assemblies 130.

Figure 22:
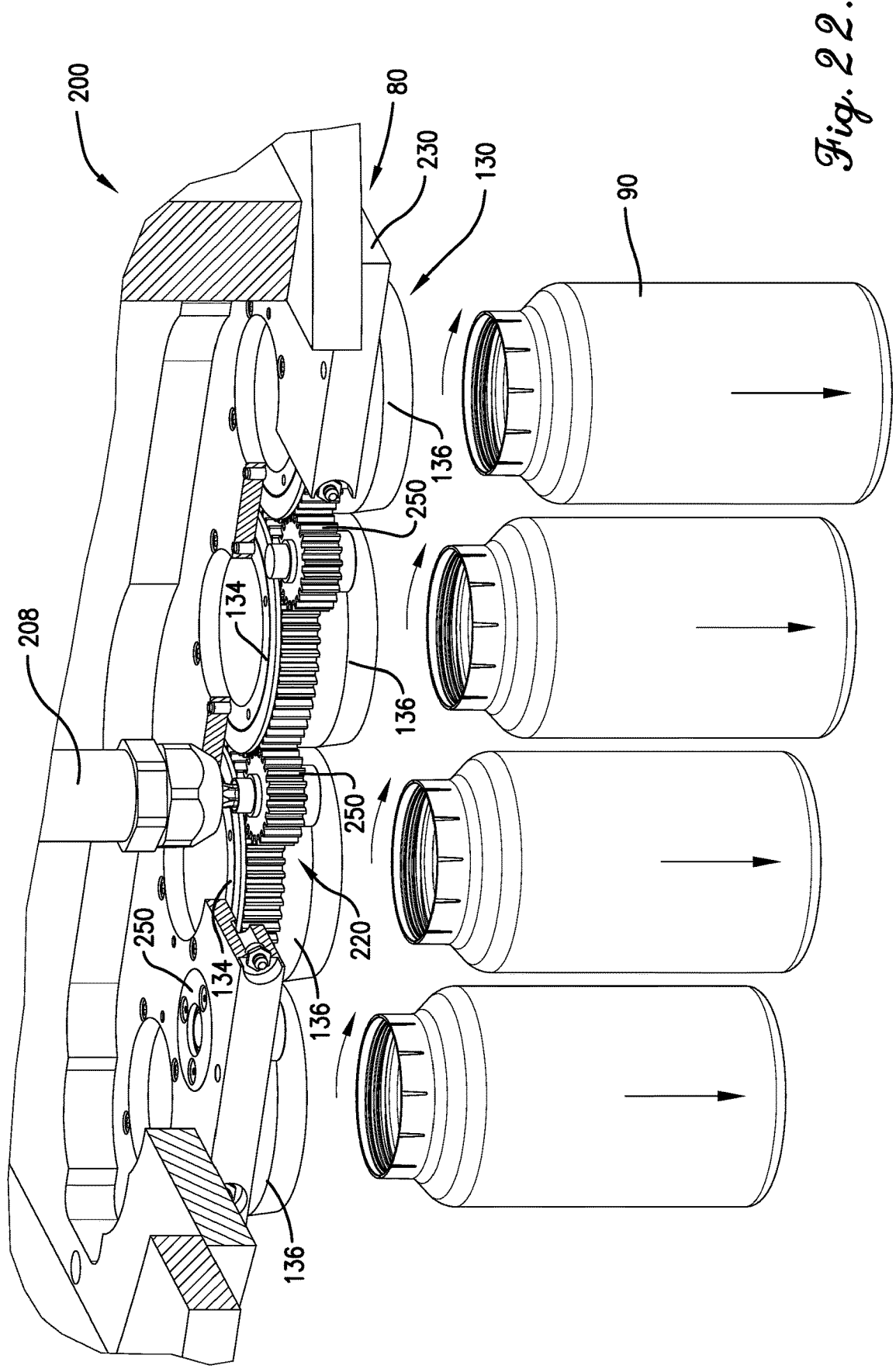
FIG. 22 is an enlarged view of the ejection station tooling from FIGS. 17-21, with bottom portions of the tooling cut away to illustrate internally-threaded molded articles being removed from their carrier assemblies.

Given the configuration described above, the ejection station tooling 200 may be used to remove internally-threaded molded articles 90 from carrier assemblies 130. Specifically, the actuator component 206 of the actuation assembly 204 may vertically shift the drive mechanism 208 downward into engagement with the center spur gear 250. At such time, the drive mechanism 208 may be energized so as to rotate the bit tip 210 and the center spur gear 250 to which it is engaged. As was described above, rotation of the center spur gear 250 will cause a corresponding rotation of the remaining spur gears 250 and of each of the pinion inserts 136 of the carrier assemblies 130 included within the carrier plate 80. As illustrated by FIG. 22, rotation of the pinion inserts 136 will cause the internally-threaded molded articles 90 to be rotated out of engagement with the threaded protrusions 48 (See FIG. 24) of the carrier insert 134 so that the articles 90 can be removed from the carrier assemblies 130 and ejected from the ISBM machine 10.

In addition to the embodiments of the ejection station tooling 200 shown in FIGS. 19-22, certain embodiments of the present invention may also include a rotation assembly 260 in the form of a helical gear 270 and a worm gear 280 embedded within the carrier plate 80, as illustrated in FIGS. 25-27. In some embodiments, the rotation assembly 260 may form part of, or otherwise be considered part of, the actuation assembly 204. In more detail, the rotation assembly 260 may comprise the helical gear 270, which is positioned generally centered with respect to the carrier plate 80. The helical gear 270 may be similar to the central spur gear 250 described above, in that a top surface may include a female-mating surface that is configured for engagement with the bit tip 210 of the drive mechanism 208, as is shown in FIG. 25. As such, the drive mechanism 208 can be caused to impart rotation to the helical gear 270.

The helical gear 270 may be engaged with a portion of the worm gear 280 so as to impart rotation to the worm gear 280. As illustrated in FIGS. 26 and 27, the worm gear 280 may comprise an elongated shaft with a plurality of worm gear sections 282 positioned along the length of the shaft. In some embodiments, a central worm gear section 282 may be positioned near a center of the worm gear 280, such that the helical gear 270 can be engaged with the central worm gear section 282 and can, thus, impart rotation to the worm gear 280. The worm gear 280 may include an additional worm gear section 282 for each of the carrier assemblies 130. Such additional worm gear sections 282 are generally aligned with each of the carrier assemblies 130. As such, the worm gear 280 extends along a length that is sufficient to extend across each of the carrier assemblies 130. Each of the additional worm gear sections 282 may be engaged with the pinion inserts 136 of the carrier inserts 130, such that rotation of the worm gear 280 can cause a corresponding rotation of the pinion inserts 136. In such embodiments, the outer/exterior surface of the pinion inserts 136 may be formed with helical gear elements that are configured to engage with the worm gear sections 202.

In such a configuration, the rotation assembly 260 embodiments of the ejection station tooling 200 may be used to remove internally-threaded molded articles 90 from carrier assemblies 130. Specifically, as illustrated in FIG. 25, the actuator component 206 of the actuation assembly 204 may vertically shift the drive mechanism 208 downward into engagement with the helical gear 270. At such time, the drive mechanism 208 may be energized so as to rotate the bit tip 210 and the helical gear 270 to which the bit tip 210 is engaged. As was described above, rotation of the helical gear 270 will cause a corresponding rotation of the worm gear 280 and each of the worm gear sections 282 included thereon. As the worm gear sections 282 are engaged with the pinion inserts 136 of the carrier assemblies 130 included within the carrier plate 80, rotation of the worm gear 280 will, thus, cause a rotation of the pinion inserts 136. Finally, rotation of the pinion inserts 136 will cause the internally-threaded molded articles 90, as illustrated in FIG. 27, to be rotated out of engagement with the threaded protrusions of the carrier insert 134 so that the articles 90 can be removed from the carrier assemblies 130 and ejected from the injection stretch blow molding machine 10.

Although the invention has been described with reference to the preferred embodiment illustrated in the attached drawing figures, it is noted that equivalents may be employed and substitutions made herein without departing from the scope of the invention as recited in the claims.

The invention claimed is:

1. Ejection station tooling for an injection stretch blow molding machine, said ejection station tooling comprising:
   a carrier plate;
   a plurality of carrier assemblies secured to said carrier plate, each of said carrier assemblies configured to carry an internally-threaded molded article; and
   an actuation assembly configured to remove each of the molded articles from its respective carrier assembly by causing the molded article to rotate with respect to a portion of its carrier assembly,
   wherein each of said carrier assemblies comprises a carrier insert and a pinion insert, with said carrier insert and said pinion insert configured to cooperatively secure one of the internally-threaded molded articles therebetween, wherein said carrier insert includes a thread-forming portion configured to form internal threads on a respective molded article, and wherein rotation of said pinion insert is configured to cause a corresponding rotation the respective molded article.

2. The ejection station tooling of claim 1, wherein said actuation assembly comprises a plurality of spur gears integrated within at least a portion of said carrier plate.

3. The ejection station tooling of claim 2, wherein an exterior surface of each of said pinion inserts includes gear elements formed thereon, wherein said spur gears are configured to engage with said gear elements of said pinion inserts, such that rotation of said spur gears is configured to cause a corresponding rotation of said pinion inserts.

4. The ejection station tooling of claim 3, wherein rotation of said pinion inserts is configured to disengage the internally-threaded molded articles from the carrier inserts, so as to eject the internally-threaded molded articles from the injection stretch blow molding machine.

5. The ejection station tooling of claim 2, wherein said actuation assembly comprises a drive mechanism configured to be shifted into engagement with one of said spur gears so as to impart rotation to each of said spur gears and to each of said pinion inserts.

6. The ejection station tooling of claim 5, wherein said drive mechanism comprises an electrically-powered driver.

7. The ejection station tooling of claim 1, wherein said actuation assembly comprises a worm gear integrated within at least a portion of said carrier plate.

8. The ejection station tooling of claim 7, wherein an exterior surface of each of said pinion inserts includes gear elements formed thereon, wherein said worm gear comprise a plurality of worm gear sections, wherein said worm gear sections are configured to engage with said gear elements of said pinion inserts, such that rotation of said worm gear is configured to cause a corresponding rotation of said pinion inserts.

9. The ejection station tooling of claim 8, wherein said actuation assembly further comprises a helical gear engaged with one of said worm gear sections and configured to impart rotation to said worm gear.

10. The ejection station tooling of claim 1, wherein said actuation assembly comprises a cam plate with a groove extending through at least a portion of said cam plate, and a roller configured to actuate through said groove of said cam plate as said cam plate is vertically shifted, wherein said roller is engaged with a rack with gears elements formed thereon.

11. The ejection station tooling of claim 10, wherein said rack is configured to engage with said pinion inserts of said carrier assemblies, wherein a downward shifting of said cam plate is configured to actuate said rack and to impart rotation to said pinion inserts so as to eject the internally-threaded molded articles from the injection stretch blow molding machine.

12. Ejection station tooling for an injection stretch blow molding machine, said ejection station tooling comprising:
   a carrier plate;
   a plurality of carrier assemblies secured to said carrier plate, each of said carrier assemblies configured to carry an internally-threaded molded article; and
   a rotation assembly integrated with said carrier plate, wherein said rotation assembly is configured to remove each of the molded articles from its respective carrier assembly by causing the molded article to rotate with respect to a portion of its carrier assembly,
   wherein each of said carrier assemblies comprises a carrier insert and a pinion insert, with said carrier insert and said pinion insert configured to cooperatively secure one of the internally-threaded molded articles therebetween, and wherein said pinion insert includes protrusions or slots for engagement with a respective molded article such that rotation of said pinion insert is configured to cause a corresponding rotation the respective molded article.

13. The ejection station tooling of claim 12, where said rotation assembly comprises a plurality of spur gears at least partially integrated with said carrier plate.

14. The ejection station tooling of claim 12, where said rotation assembly comprises a worm gear at least partially integrated with said carrier plate.

15. The ejection station tooling of claim 12, further comprising a drive mechanism configured to be shifted into engagement with said rotation assembly and to impart rotation to said rotation assembly.

16. A method of ejecting an internally-threaded molded article from an injection stretch blow molding machine, wherein injection stretch blow molding machine includes a carrier assembly comprising a carrier insert and a pinion insert, with the carrier insert and the pinion insert configured to cooperatively secure the molded article therebetween, wherein the carrier insert includes a thread-forming portion configured to form internal threads on the molded article, said method comprising the steps of:
  (a) shifting a drive mechanism into engagement with a rotation assembly;
  (b) causing one or more components of said rotation assembly to rotate;
  (c) imparting rotation from the rotation assembly to the pinion insert of the carrier assembly,
  wherein during said imparting of step (c), the molded article is disengaged from the carrier assembly by the pinion insert causing the molded article to rotate with respect to the carrier insert of the carrier assembly.

17. The method claim 16, where said rotation assembly comprises a plurality of spur gears at least partially integrated with a carrier plate that supports the carrier assembly.

18. The method claim 16, where said rotation assembly comprises a worm gear at least partially integrated with a carrier plate that supports the carrier assembly.

19. The method of claim 16, wherein the carrier assembly transports the carrier assembly and the internally-threaded molded article from a stretch blow station of the injection stretch blow molding machine to the ejection station.

* * * * *